(12) United States Patent
Ehrman et al.

(10) Patent No.: US 6,828,395 B1
(45) Date of Patent: Dec. 7, 2004

(54) POLYMERIZATION PROCESS AND CONTROL OF POLYMER COMPOSITION PROPERTIES

(75) Inventors: Fred D. Ehrman, Houston, TX (US); Pradeep P. Shirodkar, Kingwood, TX (US); Robert Lynn Santana, Baytown, TX (US); Porter C. Shannon, Seabrook, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/685,650

(22) Filed: Oct. 15, 2003

(51) Int. Cl.[7] ............................... C08F 2/34; C08F 4/60
(52) U.S. Cl. ...................... 526/114; 526/113; 526/118; 526/119; 526/70; 526/124.3; 526/160; 526/135; 526/141; 526/142; 526/147; 525/54; 525/191; 525/240
(58) Field of Search ................................. 526/113, 114, 526/118, 119, 70, 124.3, 160, 135, 141, 142, 147; 525/54, 191, 240

(56) References Cited

U.S. PATENT DOCUMENTS

| | | | |
|---|---|---|---|
| 4,354,009 A | 10/1982 | Goeke et al. | 526/125 |
| 4,387,202 A | 6/1983 | Falbe et al. | 526/138 |
| 4,855,370 A | 8/1989 | Chirillo et al. | 526/74 |
| 4,956,426 A | 9/1990 | Ardell et al. | 526/60 |
| RE33,683 E | 9/1991 | Allen et al. | 502/107 |
| 5,066,736 A | 11/1991 | Dumain et al. | 526/82 |
| 5,194,526 A | 3/1993 | Hussein et al. | 526/74 |
| 5,200,502 A | 4/1993 | Kao et al. | 528/494 |
| 5,244,987 A | 9/1993 | Bernard et al. | 526/78 |
| 5,525,678 A | 6/1996 | Mink et al. | 525/246 |
| 5,625,012 A | 4/1997 | Hussein et al. | 526/74 |
| 5,733,988 A | 3/1998 | Apecetche et al. | 526/74 |
| 5,882,750 A | 3/1999 | Mink et al. | 428/35.7 |
| 6,274,684 B1 | 8/2001 | Loveday et al. | 526/114 |
| 6,313,236 B1 | 11/2001 | Ford et al. | 526/74 |
| 6,417,298 B1 | 7/2002 | Ford et al. | 526/89 |
| 6,417,299 B1 | 7/2002 | Ford et al. | 526/89 |
| 6,420,474 B1 | 7/2002 | Carey et al. | 524/501 |
| 6,569,963 B2 | 5/2003 | Nowlin et al. | 526/114 |
| 6,596,824 B2 | 7/2003 | Nambu et al. | 526/82 |

FOREIGN PATENT DOCUMENTS

| | | |
|---|---|---|
| EP | 0 315 192 | 5/1991 |
| EP | 0 630 910 | 12/1994 |
| EP | 1 159 311 | 12/2001 |
| SU | 1 249 025 | 8/1986 |
| WO | WO 01/00691 | 1/2001 |
| WO | WO 02/46246 | 6/2002 |

*Primary Examiner*—Roberto Rabago
(74) *Attorney, Agent, or Firm*—Kevin M. Faulkner

(57) ABSTRACT

Methods of controlling rheological properties of polymer compositions comprising at least one high molecular weight polymer and one low molecular weight polymer are disclosed. The polymer compositions are produced by polymerizing monomers in a single reactor using a bimetallic catalyst composition. A control agent such as, for example, an alcohol, ether, oxygen or amine is added to the reactor to control the rheological properties of the reactor. The polymerization takes place in the presence of rheological-altering compounds such as alkanes and aluminum alkyls. The control agents are added in an amount sufficient to counter the influences of the rheological-altering compounds.

40 Claims, 1 Drawing Sheet

POLYMERIZATION PROCESS AND CONTROL OF POLYMER COMPOSITION PROPERTIES

CROSS-REFERENCE TO RELATED APPLICATION

The present application is related to U.S. patent application Ser. No. 10/685,607, entitled "Polymerization Process and Control of Polymer Composition Properties", filed Oct. 15, 2003.

FIELD OF THE INVENTION

The present invention relates to the polymerization of olefins in a single reactor using bimetallic catalysts, and more particularly to the control of the flow index and/or amounts of polymer composition components ("split") by the addition of a control agent that, in certain embodiments, is selective for one catalyst component of the bimetallic catalyst composition.

BACKGROUND OF THE INVENTION

Broad or bimodal molecular weight distribution polymer compositions are compositions that typically include one or more high molecular weight polymers and one or more low molecular weight polymers. In bimodal molecular weight distribution polymer compositions, the weight fraction of the high molecular weight ("HMW") polymer typically ranges from, for example, 0.10 to 0.90 for applications requiring broad molecular weight distribution polymers. The relative amount of HMW polymer in the polymer composition can influence the rheological properties of the composition. One such measurable rheological property of bimodal polymer compositions is its flow index ("FI", or $I_{21}$, measured at 190° C., 21.6 kg according to ASTM D-1238). The $I_{21}$ of the bimodal polymer composition, in one embodiment, possesses an $I_{21}$ that is between 2 and 100 dg/min. This range represents a balance between processability (desiring relatively high $I_{21}$) on the one hand, and product (film, etc.) toughness (desiring relatively low $I_{21}$) on the other hand. Hence, it is necessary to control polymer composition $I_{21}$ in the polymerization reactor.

One desirable method of producing bimodal polymer compositions is through the use of a bimetallic catalyst composition in a single reactor such as disclosed in, for example, U.S. Pat. No. 5,882,750 and U.S. Pat. No. 6,274,684. Such compositions incorporate at least two, preferably two, metal centers, both of which may be the same or different metal with similar or differing coordination spheres, patterns of substitution at the metal center or ligands bound to the metal center. Typically, one of the metal centers produces a low molecular weight ("LMW") polymer while the other produces a HMW polymer in the single polymerization reactor, and desirably, although not necessarily, simultaneously. U.S. Pat. No. 5,525,678 to Mink et al. discloses the use of water and carbon dioxide in controlling the $I_{21}$ using one such bimetallic catalyst composition. WO 02/46246 to Mawson et al.; U.S. Pat. Nos. 6,420,474 and 6,569,963 to Nowlin et al. disclose the addition of an additional catalyst to adjust the relative amounts of HMW and LMW polymers in a polymer composition. However, the products resulting therefrom, such as bimodal resins used to make films, may still suffer from gel formation, the reaction process itself may be subject to fouling, which causes an undesirable need to shut down the polymerization reactor, and further, the procedure of adding a catalyst component can add cost and complexity to the process.

What is needed is an improved method of controlling $I_{21}$ in the manufacture of bimodal polymer compositions when using bimetallic catalyst compositions. While many types of compounds have been disclosed for use in polymerization reactors, for example in WO 01/00691; U.S. Pat. No. 6,596,824; U.S. Pat. No. 6,417,299; U.S. Pat. No. 6,417,298; U.S. Pat. No. 6,313,236; U.S. Pat. No. 5,733,988, U.S. Pat. No. 5,625,012; U.S. Pat. No. 5,244,987; U.S. Pat. No. 5,200,502; U.S. Pat. No. 5,194,526; U.S. Pat. No. 5,066,736; U.S. Pat. No. 4,855,370; and EP 1 159 311, EP 0 630 910 and EP 0 315 192; and Soviet Union Patent No. 1 249 025, and specifically, the use of aluminum compounds, for example RE 33,683, U.S. Pat. No. 6,420,474 and U.S. Pat. No. 6,569,963, and EP 0 315 192; there is still the problem of effective $I_{21}$ control in the manufacture of bimodal polymer compositions when using bimetallic catalyst compositions. The inventors have unexpectedly found that there exists a broad class of compounds useful as $I_{21}$ control agents, or "split" control agents, that also have other advantages as described herein.

SUMMARY OF THE INVENTION

The present invention is directed to methods of controlling the rheological properties of a polymer composition generated by a bimetallic catalyst system in a single reactor, the control affected by the use of control agents; the control agents are added in an amount sufficient to alter the relative ratios, or "split" of the HMW and LMW polymer components of the polymer compositions. More particularly, the control agents are used as described herein to counter the rheological-altering influences in bimetallic catalyst systems of such compounds as alkanes and aluminum alkyls.

One aspect of the present invention is a method of producing a polymer composition in the presence of rheological-altering compounds comprising incorporating a high molecular weight polymer into a low molecular weight polymer to form the polymer composition in a single polymerization reactor in the presence of polymerizable monomers, a bimetallic catalyst composition and at least one control agent; wherein the control agent is added in an amount sufficient to control the level of incorporation of the high molecular weight polymer, the level of low molecular weight polymer, or both.

Figure 1:
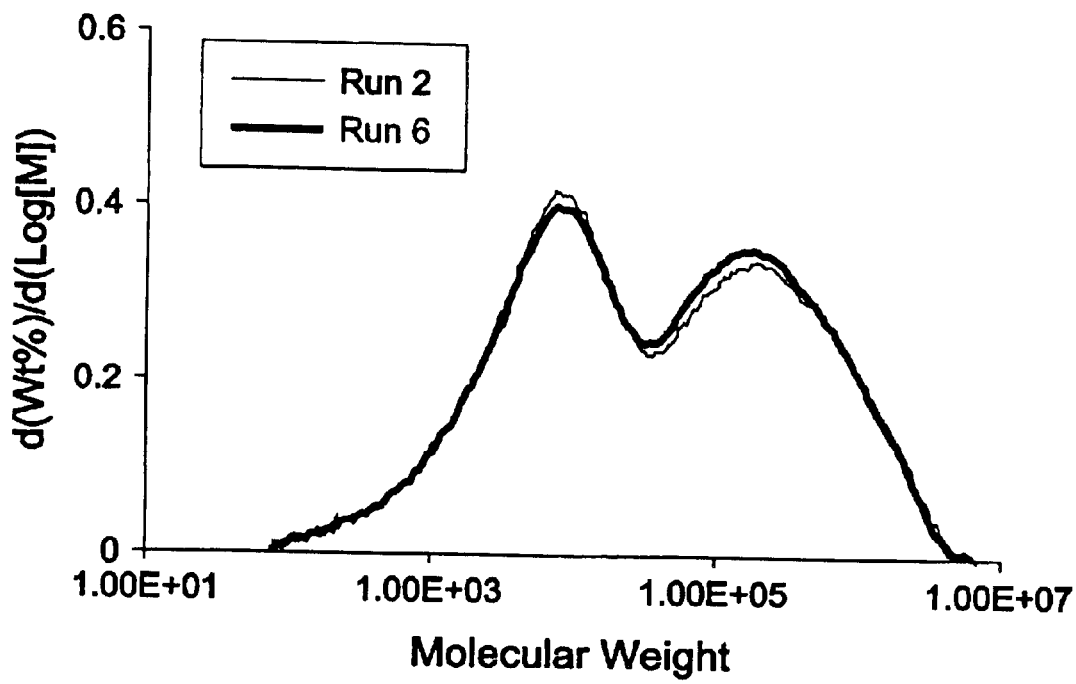
FIG. 1 is a graphic representation of GPC data derived from runs 2 and 6 exemplifying the effects of an aluminum alkyl.

DETAILED DESCRIPTION OF THE INVENTION 1.0 General Definitions

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("———") used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

2.0 Use of the Control Agent

The present invention is directed to a method of controlling the rheological properties of a polymer composition generated by a bimetallic catalyst system in a single reactor, the control affected by the use of "control agents"; the control agents are added in an amount sufficient to alter the relative ratios, or "split" of the HMW and LMW polymer components of the polymer compositions. More particularly, the present invention is directed to maintaining certain rheological properties of the polymer composition at a desirable "target", one such property being the $I_{21}$ of the polymer composition, the rheological properties being maintained at the target level by the addition of control agents. Even more particularly, the control agents are used as described herein to counter unexpected rheological-altering influences in bimetallic catalyst systems of such compounds as alkanes (used, for example, as "condensing agents" as in U.S. Pat. No. 5,462,999) and aluminum alkyls (used, for example, as activators such as in RE 33,683).

One aspect of the present invention is a method of producing a polymer composition in the presence of rheological-altering compounds comprising incorporating a high molecular weight polymer into a low molecular weight polymer to form the polymer composition in a single polymerization reactor in the presence of polymerizable monomers, a bimetallic catalyst composition and at least one control agent; wherein the control agent is added in an amount sufficient to control the level of incorporation of the high molecular weight polymer, the level of low molecular weight polymer, or both. The "polymer composition" in one embodiment is a bimodal polymer composition, and in a more particular embodiment, a bimodal polyethylene composition wherein from greater than 80 wt % of the monomer derived units of the composition are ethylene and the remaining 0 to 20 wt % are derived from $C_3$ to $C_{12}$ olefins and diolefins, described further herein.

The term "incorporation" is not herein limited to any particular method of combining the HMW and LMW polymers, and may comprise any technique known in the art. In one embodiment, "incorporating" refers to the in situ blending of HMW and LMW polymers together as they are being formed in the polymerization reactor(s); and in yet a more particular embodiment, the in situ blending of HMW and LMW polymers together as they are being formed in a single polymerization reactor in a single stage process.

Another aspect of the present invention is a method of controlling the $I_{21}$ of a polymer composition in the presence of rheological-altering compounds comprising forming a high molecular weight polymer and a low molecular weight polymer in a single polymerization reactor in the presence of polymerizable monomers, a bimetallic catalyst composition and at least one control agent; wherein the control agent is added in an amount sufficient to control the level of incorporation of the high molecular weight polymer, the level of low molecular weight polymer, or both.

Yet another aspect of the invention is a method of producing a polymer composition in the presence of rheological-altering compounds comprising contacting a bimetallic catalyst composition, a control agent and polymerizable monomers in a single polymerization reactor; characterized in that the bimetallic catalyst composition comprises a first catalyst component and a second catalyst component, wherein the first catalyst component is capable of producing a low molecular weight polymer and the second catalyst component is capable of producing a high molecular weight polymer; wherein the control agent substantially alters the polymerization activity of the first or second catalyst component relative to the second or first catalyst component, respectively. In a more particular embodiment, the control agent substantially lowers the polymerization productivity (or activity) of the second catalyst component relative to the first catalyst component.

The polymer compositions of the present invention include at least one low molecular weight ("LMW") polymer and at least one high molecular weight ("HMW") polymer, and in one embodiment include one of each. The LMW polymer and HMW polymers are incorporated into one another either sequentially or simultaneously in a single polymerization reactor, and are incorporated into one another simultaneously in a single polymerization reactor in a particular embodiment. Polymerization reactors are well known in the art; preferable polymerization reactors include those capable of polymerizing olefins to form polyolefins such as polyethylene, polypropylene, etc., such as gas phase, and solution or slurry phase reactors. In a particular embodiment of the invention, the polymerization reactor is a fluidized-bed, gas phase reactor such as disclosed in WO 03/044061 and U.S. Pat. No. 4,003,712, typically comprising at least one reactor, only one reactor in a particular embodiment, the reactor comprising a reaction zone and a velocity reduction zone or expanded region; the polymerization reactor further comprising at least one recycle line that is continuous from one portion, preferably a top portion of a vertical reactor, to another portion, preferably a bottom portion of a vertical reactor, having a heat exchanger therebetween. The bimetallic catalyst composition and primary monomers, ethylene in a particular embodiment, as well as hydrogen and other gases, enter the reactor wherein the reaction zone comprises a bed of growing polymer particles maintained in a fluidized state. In one embodiment, unreacted gases flow through the fluidized bed of growing polymer particles, into the expanded region of the reactor where solid polymer particles are allowed to settle, then pass through the recycle line, wherein the gasses are cooled in a heat exchanger before reentering the reactor through a remaining portion of the recycle line.

The LMW polymer in one embodiment is a polyolefin, and more particularly, a polyethylene homopolymer or copolymer comprising from 0 to 10 wt % $C_3$ to $C_{10}$ α-olefin derived units, and more particularly, a homopolymer of ethylene or copolymer of ethylene and 1-butene, 1-pentene or 1-hexene derived units. The LMW polymer can be characterized by a number of factors. The weight average molecular weight of the LMW polymer ranges from 4,000 to 200,000 amu (Daltons) in one embodiment, and from 5,000 to 100,000 amu in another embodiment, and from 5,000 to 80,000 amu in another embodiment, and from 5,500 to 50,000 amu in yet another embodiment, and from 6,000 to 20,000 amu in yet another embodiment, wherein a desirable weight average molecular weight of the LMW polymer can comprise any combination of any upper limit with any lower limit described herein.

The HMW polymer in one embodiment is a polyolefin, and more particularly, a polyethylene homopolymer or copolymer comprising from 0 to 10 wt % $C_3$ to $C_{10}$ α-olefin derived units, and more particularly, a homopolymer of ethylene or copolymer of ethylene and 1-butene, 1-pentene or 1-hexene derived units. The weight average molecular weight of the HMW polymer ranges from 50,000 to 1,000,000 amu (Daltons) in one embodiment, and ranges from 100,000 to 800,000 in another embodiment, and from 250,000 to 700,000 amu in another embodiment, and from 300,000 to 600,000 amu in yet another embodiment, wherein a desirable weight average molecular weight of the HMW polymer can comprise any combination of any upper limit with any lower limit described herein.

The polymer composition of the invention, comprising at least the HMW and LMW polymers, can be described by any number of parameters; and in one embodiment possesses a "weight average" molecular weight distribution (Mw/Mn) of from 2.5 to 150, a "z-average" molecular weight distribution (Mz/Mw) of from 2 to 10, an $I_2$ (190° C./2.16 kg) of from 0.01 to 10 g/10 cm, an $I_{21}$ (190° C./21.6 kg) of from 2 or 4 to 100 or 500 dg/min, and a density in the range of from 0.890 to 0.970 g/cm$^3$. One desirable measure of the polymer composition properties is its flow index or $I_{21}$, as this value often determines the usefulness of the polymer composition for a given end use application. In one aspect of the present invention, this parameter of the polymer composition of the invention is controlled by the introduction of a control agent in conjunction with a bimetallic catalyst composition into the polymerization reactor. In a particular embodiment, the polymer composition consists essentially of one HMW polymer and one LMW polymer.

By "in the presence of rheological-altering compounds", it is meant that the polymerization process is taking place in a reactor wherein agents selected from aluminum alkyls and alkanes, in particular, $C_4$ to $C_{20}$ alkanes, are present in the reactor. The aluminum alkyls are compounds comprising aluminum and alkyl groups, alkoxy groups, halogen groups, and mixtures thereof; and more particularly, aluminum alkyls are compounds of the formula AlR$_3$, wherein each R is independently selected from the group consisting of halogens, $C_1$ to $C_{20}$ alkyls, $C_6$ to $C_{20}$ aryls, and $C_1$ to $C_{20}$ alkoxys, and substituted versions thereof; and in a particular embodiment, the aluminum alkyl is trimethylaluminum ("TMA"). As described herein, "alkanes" includes linear and branched alkanes. In one embodiment, the alkanes are selected from $C_4$ to $C_{12}$ alkanes, and in yet another embodiment, selected from pentane, hexane, and isomers and mixtures thereof.

The amount of alkane ranges from 0.1 to 50 wt % based on the primary monomer feed rate in one embodiment, and from 0.5 to 30 wt % in another embodiment, and from 1 to 20 wt % in yet another embodiment, and from 2 to 18 wt % in yet another embodiment, and from 5 to 12 wt % in yet another embodiment, wherein a desirable range of alkane comprises any combination of any upper wt % limit with any lower wt % limit described herein.

The amount of aluminum alkyl ranges from 1 to 500 wt ppm based on the primary monomer feed rate in one embodiment, and from 10 to 300 wt ppm in another embodiment, and from 20 to 200 wt ppm in yet another embodiment, and from 50 to 150 wt ppm in yet another embodiment, wherein a desirable range comprises any combination of any upper wt ppm limit with any lower wt ppm limit as described herein.

The control agent can be introduced into any portion of the polymerization reactor, and may be introduced with or separate from the bimetallic catalyst composition, separate from the bimetallic catalyst composition in a particular embodiment. In one embodiment, the control agent is introduced into the recycle line of a fluidized-bed gas phase reactor comprising a recycle line and reactor, and in a more particular embodiment, is introduced into the recycle line upstream of the heat exchanger.

The control agent in one embodiment is any chemical compound having a reactive moiety capable of affecting the polymerization productivity of at least one catalyst component of the bimetallic catalyst composition. Examples of such include alcohols, ethers, thiols, amines nitrogen oxides, oxygen, and other oxygen or sulfur or nitrogen-containing compounds. The control agent excludes water and carbon dioxide; however, in one embodiment, water is added to the polymerization reactor in addition to the control agent. The control agent is not part of the bimetallic catalyst composition, but is a distinct component or composition added to the polymerization reactor separately; the control agent is introduced in a distinct physical location in the reactor relative to the introduction of the bimetallic catalyst composition to the polymerization reactor in a particular embodiment. In one embodiment, the bimetallic catalyst composition is introduced to the fluidized bed portion of a gas phase polymerization reactor and the control agent is introduced into the recycle line of the same reactor, either simultaneously or intermittently relative to the introduction of the catalyst.

The control agent can be further described by any number or combination of features. In one embodiment, the control agent is in a nebulous or gaseous state at a temperature of from 50° C. to 120° C. and a pressure of from 1 to 100 bar (or from 100 to 10,000 kPa). By "nebulous", it is meant that the control agent may, as a liquid or solution, be in a mist or "atomized" state at the given temperature and pressure range, preferably, in such a state when present in the polymerization reactor to which it is introduced. In another embodiment, the control agent is in a nebulous or gaseous state at a temperature of from 70° C. to 100° C. and a pressure of from 10 to 80 bar (or from 1000 kPa to 7,900 kPa). In a more particular embodiment, the control agent is selected from the group consisting of alcohols, ethers, aldehydes, ketones, amines (alkylamines, ammonia, and salts thereof), $O_2$ carbon monoxide, and mixtures thereof; and even more particularly, the control agent is selected from the group consisting of $C_1$ to $C_{10}$ alcohols, $C_2$ to $C_{16}$ ethers, $C_2$ to $C_{10}$ aldehydes, $C_3$ to $C_{16}$ ketones, ammonia and $C_1$ to $C_{16}$ alkylamines, $O_2$, carbon monoxide, and mixtures thereof; and yet even more particularly, the control agent is selected from the group consisting of $C_1$ to $C_{10}$ alcohols, $C_2$ to $C_{10}$ ethers, $O_2$, and mixtures thereof. In yet another embodiment, the control agent is selected from the group consisting of $C_1$ to $C_{10}$ mono-alcohols and $C_2$ to $C_{10}$ mono-ethers, $C_1$ to $C_5$ alcohols, $C_2$ to $C_5$ ethers, amines, oxygen, and combinations thereof; and in yet another more particular embodiment, the control agent is selected from the group consisting of $C_1$ to $C_{10}$ mono-alcohols and $C_2$ to $C_{10}$ mono-ethers, amines, oxygen, and combinations thereof; and in yet a more particular embodiment, the control agent is selected from the group consisting of $C_1$ to $C_{10}$ mono-alcohols and $C_2$ to $C_{10}$ mono-ethers, oxygen, and combinations thereof.

The "alkylamines" described herein include compounds of the formula $R^1R^2R^3N$, wherein N is nitrogen and each of $R^1$, $R^2$, and $R^3$ are bound to the nitrogen and independently selected from hydrogen, halogens and alkyls; independently selected from hydrogen, chloride, bromide, and $C_1$ to $C_{16}$ alkyls in a particular embodiment; wherein at least one R group is an alkyl group. Examples of such compounds include trimethylamine, triethylamine, tributylamine, dibutylaminechloride, dimethylaminehydride, and mixtures thereof. The alkylamine useful in the present invention is not herein limited to its physical form, and includes salts of alkylamines. Further, ammonia is not limited to $NH_3$, but includes its hydrated form and/or salts of ammonia (e.g., ammonium bromide, ammonium bicarbonate, ammonium alum, etc.).

Examples of alcohols include linear, branched and cyclic alcohols such as methanol, ethanol, propanol, isopropanol, octanol, cyclohexanol, phenol, and mixtures thereof. Examples of ethers include linear, branched and cyclic ethers such as diethylether, dibutylether, tetrahydrofuran, 2,6-dimethyoxyphenol, methylphenylether and mixtures thereof, and other compounds including both "ether" and "alcohol" moieties. The "mono-alcohols" are those comprising only one hydroxyl group; "mono-ethers" are those comprising only one carbon-oxygen-carbon moiety.

Water may also be present (or added to the polymerization reactor) with the control agent in a particular embodiment; water is present from 1 to 50 wt ppm based on the flow rate of the primary monomer in one embodiment, and present from 2 to 40 wt ppm in another embodiment; and present from 3 to 30 wt ppm in yet another embodiment. Although it is known that water can influence the HMW/LMW split and $I_{21}$ of the polymer composition (U.S. Pat. No. 5,525, 678), it has been unexpectedly found that a combination of water and a control agent also controls these parameters. Alternately, the control agent alone in the substantial absence of water is also useful. By "substantial absence", it is meant that water is not added to the reactor, and if present, is present to less than 1 wt ppm based on the flow rate of the primary monomer.

The use of the control agent is not herein limited by the means of introducing the control agent to the polymerization reactor. The control agent may be dissolved in a diluent (e.g., a $C_4$ to $C_{10}$ branched or linear alkane, water, alcohol, ether) at any concentration and added to the polymerization reactor, and/or may be added along as a liquid or slurry, and/or may be accompanied by a carrier gas such as nitrogen, etc, and may be combined with one or more other control agents. Desirably, once in the reactor, the control agent is in a nebulous or gaseous form. The control agent may be introduced to the reactor in an amount that varies with time, or at a constant rate (within instrumental error), and is added at a constant rate in a particular embodiment.

The control agent is added to the polymerization reactor in an amount sufficient to control the level of incorporation of the HMW polymer, the level of LMW polymer, or both (or the "split"); stated another way, the control agent is added in an amount to influence, either increase or decrease, the $I_{21}$ value of the polymer composition produced in the polymerization reactor. In one embodiment, the control agent is added in an amount sufficient to increase or decrease, decrease in a particular embodiment, the level of incorporation of the HMW polymer by from 0.5 to 50 wt % in one embodiment, and from 1 to 40 wt % in another embodiment, and from 2 to 30 wt % in yet another embodiment, and from 3 to 20 wt % in yet another embodiment, and from 4 to 10 wt % in yet another embodiment based on the total amount of polymer composition, wherein a desirable range of reduction comprises any combination of any upper wt % limit with any lower wt % limit described herein.

The amount of increase or decrease of the HMW polymer (and LMW polymer) is described relative to its level in the absence or lack of change in a constant value in the amount of control agent. The control agent and/or water may be added in any level to maintain the rheological properties of the polymer composition of the invention at a desirable level. Thus, for example, while the control agent may be added in an amount to decrease the HMW polymer by from 0.5 to 10 wt %, this addition may be in response to a countervailing event or phenomena that has caused the HMW polymer to increase to an undesirable (or "non-target") level. Thus, in this manner, the level of HMW and LMW polymer (and hence, the rheological properties such as $I_{21}$) can be maintained or "controlled" at a desirable target level.

The control agent can also be characterized by the amount it influences the level of the LMW polymer of the polymer composition. In one embodiment, the level of the LMW polymer increases or decreases, preferably decreases, by from 0, or 1, or 2 or 5 to 10 or 15 or 20 wt % based on the total amount of polymer composition, upon introduction of a control agent to the polymerization reactor. The control agent may influence the HMW polymer independent of the LMW polymer in one embodiment; in another embodiment, the HMW and LMW polymers are simultaneously influenced by the presence of the control agent.

Described in yet another way, the control agent is added in an amount to substantially alter—or in a particular embodiment, lower—the polymerization productivity of at least one catalyst component of the bimetallic catalyst composition; in one embodiment in an amount to substantially lower the productivity of the second catalyst component (described herein) relative to the first catalyst component. By "substantially lower", it is meant that the polymerization productivity and/or activity of the affected catalyst component decreases in the presence of the control agent by from less than 1 or 2 or 5 or 10 to 80 or 100 or 200% in one embodiment, relative to the catalyst productivity in the absence of control agent. By "substantially alter", it is meant that the polymerization productivity and/or activity of the affected catalyst component decreases or increases in the presence of the control agent by from less than 2 or 5 or 10 to 80 or 100 or 200% in one embodiment, relative to the catalyst productivity in the absence of control agent.

In one embodiment, the amount of control agent present in the polymerization reactor is in a range of from 0.1 ppm to 500 ppm, based on the primary monomer feed rate; and present from 1 to 100 ppm in another embodiment, and from 2 to 50 ppm in yet another embodiment; and from 2 to 40 ppm in yet another embodiment, wherein a desirable range of control agent in the polymerization reactor comprises any combination of any upper limit with any lower limit described herein. In a particular embodiment, the control agent is present at from greater than 1 wt ppm in the polymerization reactor, based on the feed rate of primary monomer.

It is known in the art that chemical agents may be used as "electron donors" in certain catalyst compositions, such as in U.S. Pat. No. 6,191,239; U.S. Pat. No. 4,356,295; U.S. Pat. No. 4,312,783; EP 0 500 530; EP 0 103 120 and EP 0

102 503. In those disclosures, the use of such chemical agents is as an electron donor to the catalyst composition, and the chemical agent is part of the catalyst itself. The control agents of the present invention are distinct in that they are not part of the catalyst composition, and in a particular embodiment are added to the polymerization reactor separate from the bimetallic catalyst composition. In a more particular embodiment, the bimetallic catalyst composition is added to the fluidized bed of a gas phase reactor, while the control agent is added to the recycle line of the gas phase reactor. In the present invention, the control agent is added at a level sufficient to effectuate the control of the LMW/HMW ratio ("split") and/or the $I_{21}$. And in a more particular embodiment, the bimetallic catalyst composition and control agent contact one another exclusively in the recycle line of the polymerization reactor upon first introduction of the control agent to the polymerization reactor.

The control agent is introduced into a polymerization reactor being operated in conjunction with a bimetallic catalyst composition. Such bimetallic catalyst compositions comprise at least two, preferably two, metal centers, both of which may be the same or different metal with similar or differing coordination spheres, patterns of substitution at the metal center or ligands bound to the metal center. In one embodiment, the bimetallic catalyst composition comprises a first catalyst component and a second catalyst component, wherein the first catalyst component is capable of producing a low molecular weight polymer and the second catalyst component is capable of producing a high molecular weight polymer. In a particular embodiment, the first and second catalyst components are supported on a support medium such as an inorganic oxide or polymer support material; either one or both catalysts are supported on a collection of the same support material.

In one embodiment, the bimetallic catalyst composition comprises at least two catalyst components selected from the group consisting of metallocenes, Ziegler-Natta catalysts, metal-amido catalysts, and chromium catalysts, the compounds capable of catalyzing the polymerization of olefins to form polyolefins. Metallocenes are disclosed in, for example, U.S. Pat. Nos. 6,143,686; 5,972,823; 5,665,800; 5,643,847; 5,580,939; 5,324,800; 5,272,236; 5,278,272; 5,017,714; 4,808,561; 4,752,597; 4,701,432; 4,530,914; 5,783,638. Ziegler-Natta catalysts are disclosed in, for example, EP 0 703 246; U.S. Pat. No. 5,525,678 and U.S. Pat. No. 5,290,745. Examples of metal-amido catalysts are disclosed in, for example, Lan-Chang Liang, Richard R. Schrock, William M. Davis and David H. McConville, 121 J. AM. CHEM. Soc. 5797–5798 (1999); U.S. Pat. Nos. 6,593,438; 6,380,328 and U.S. Pat. No. 6,274,684. Examples of chromium catalysts are disclosed in, for example, U.S. Pat. Nos. 3,887,494; 3,119,569; 3,900,457; 4,981,831; 4,364,842; and 4,444,965; and include chromium-cyclopentadienyls, chromium oxides, chromium alkyls, supported and modified variants thereof as is common in the art. The bimetallic catalyst composition may comprise a combination of two or more of the same class of catalyst compounds, for example, two metallocenes as disclosed in U.S. Pat. No. 4,530,914.

In a more particular embodiment, the bimetallic catalyst composition comprises a metallocene, and another catalyst component selected from the group consisting of titanium and magnesium-containing Ziegler-Natta catalysts and metal-amido catalysts. In yet another embodiment, the bimetallic catalyst composition comprises a metallocene, and a titanium and magnesium-containing Ziegler-Natta catalyst. In any of these embodiments, the catalyst compounds may be supported, and in a particular embodiment, both catalyst components are supported, the support in a particular embodiment being an inorganic oxide support.

In one aspect of the invention, the control agent is present in the polymerization reactor such that the molar ratio of control agent to titanium of the Ziegler-Natta catalyst ranges from 0.01 to 30; and from 0.05 to 20 in another embodiment, and from 2 to 18 in yet another embodiment, and from 4 to 16 in yet another embodiment, wherein a desirable range comprises any upper limit combined with any lower limit described herein. In a particular embodiment, the control agent substantially reduces the polymerization productivity of the Ziegler-Natta component of the bimetallic catalyst composition comprising metallocene and titanium-based Ziegler-Natta catalyst components.

The present invention can be described by any suitable combination of embodiments described herein to effectuate the control of the $I_{21}$ of the polymer composition produced by the method of the invention, or control the level of incorporation of the HMW and LMW polymers of the polymer compositions. The first and second catalyst components of the bimetallic catalyst, supports, activators, methods of polymerization, polymer compositions and other components are described further herein.

For example, one embodiment of the method of polymerizing monomers to produce a polymer composition as described herein comprises combining a bimetallic catalyst composition in the fluidized bed of a gas phase reactor with monomers, preferably olefins, and an amount of hydrogen at a temperature of from 50° C. to 120° C., and an amount of an aluminum alkyl and, optionally an alkane, to obtain the polymer composition having a flow index value A; followed by the introduction of a continuous amount of a control agent and/or water ranging from 0.1 to 50 ppm based on the rate of primary monomer introduction to the polymerization reactor, preferably ethylene, the introduction of control agent being at the recycle line upstream from the heat exchanger of the polymerization reactor, in order to obtain a polymer composition having a flow index value of B; wherein A and B differ by more than 2, or 4, or 10, or 20 dg/min or more in $I_{21}$ value; and wherein in a particular embodiment, the value of A is lower than the value of B by between 2 or 4 or 10 or 20 dg/min or more in $I_{21}$ value. By "continuous amount", it is meant an amount that is substantially constant (within experimentally controllable and measurable error) for at least 0.5 to 10 hours or more.

Of course, the process can also be carried out in reverse order, starting with an amount of control agent, with water optionally, followed by the decrease or removal of the control agent; and the individual elements of the method can be varied as described herein. Further, other agents that may have a reverse influence on the split and/or $I_{21}$, such as a $C_4$ to $C_{10}$ alkane or an aluminum alkyl, may be added simultaneously or intermittently to achieve a balance of $I_{21}$ and/or split in the polymer composition.

The use of control agents is particularly characterized in maintaining target rheological properties of polymer compositions generated using bimetallic catalysts for use in a single reactor, and even more particularly, maintaining the target values in the presence of agents that might influence the rheological properties in such a manner as to move the rheological properties from their target values. Surprisingly, it has been found that alkanes and aluminum alkyls can alter the split of polymer compositions produced using bimetallic catalyst compositions. Thus, in one embodiment of the present invention, control agents and water are used to balance the effects of alkylaluminums and alkanes on the rheological properties of polymer compositions of the invention.

One aspect of such control includes a method of producing a polymer composition having a target $I_{21}$ comprising incorporating a high molecular weight polymer into a low molecular weight polymer to form the polymer composition in a single gas phase polymerization reactor in the presence of polymerizable monomers, a bimetallic catalyst composition and at least one control agent; wherein the control agent is added in an amount sufficient to control the weight average molecular weight of the high molecular weight polymer, the level of low molecular weight polymer, or both; and wherein the gas phase polymerization reactor comprises a fluidized bed and a fluidizing medium, the fluidizing medium comprises a compound selected from the group consisting of $C_4$ to $C_{20}$ alkanes; and wherein as the amount of alkane increases in the reactor, the amount of control agent is increased in order to maintain the polymer composition at its target $I_{21}$.

Another aspect of the invention includes a method of controlling the $I_{21}$ of a polymer composition having a target $I_{21}$ comprising forming a high molecular weight polymer and a low molecular weight polymer in a single gas phase polymerization reactor in the presence of polymerizable monomers, a bimetallic catalyst composition and at least one control agent; wherein the control agent is added in an amount sufficient to control the weight average molecular weight of the high molecular weight polymer, the level of low molecular weight polymer, or both; and wherein the gas phase polymerization reactor comprises a fluidized bed and a fluidizing medium, the fluidizing medium comprising a compound selected from the group consisting of $C_4$ to $C_{20}$ alkanes; and wherein as the amount of alkane increases in the reactor, the amount of control agent is increased in order to maintain the polymer composition at its target flow index.

Yet another aspect of the invention includes a method of producing a polymer composition having a target $I_{21}$ comprising contacting a bimetallic catalyst composition, a control agent and polymerizable monomers in a single gas phase polymerization reactor; characterized in that the bimetallic catalyst composition comprises a first catalyst component and a second catalyst component, wherein the first catalyst component is capable of producing a low molecular weight polymer and the second catalyst component is capable of producing a high molecular weight polymer; and wherein the control agent increases the polymerization activity of the second catalyst component relative to the first catalyst component; and wherein the gas phase polymerization reactor comprises a fluidized bed and a fluidizing medium, the fluidizing medium comprising a compound selected from the group consisting of $C_4$ to $C_{20}$ alkanes; and wherein as the amount of alkane increases in the reactor, the amount of control agent is increased in order to maintain the polymer composition at its target flow index.

The target $I_{21}$ of the polymer composition may vary depending upon the desired end use application. In one embodiment the target $I_{21}$ ranges from 3 to 100 dg/min, and ranges from 4 to 20 dg/min in another embodiment, and ranges from 10 to 50 dg/min in another embodiment, and ranges from 5 to 15 dg/min in yet another embodiment, and ranges from 8 to 40 dg/min in yet another embodiment. Whatever, the case, the $I_{21}$ of a given polymer composition being generated by a bimetallic catalyst composition under polymerization conditions may be controlled by a series of steps in sequence in any order or simultaneously, wherein (a) an amount of alkane is added to the reactor;
(b) an amount of control agent, is also added to the reactor; and
(c) an amount of water is added to the reactor;

wherein an addition or increase in alkane precipitates a need to introduce, increase or decrease control agent, water or both; and in another embodiment, a decrease in alkane precipitates a need to introduce, increase or decrease in control agent, water or both. In a particular embodiment, the introduction or increase in the level of alkane precipitates the need to introduce or increase the level of control agent or water.

In a particular embodiment, the target $I_{21}$ ranges from 4 to 50 dg/min; the amount of alkane ranges from 0.5 or 1 or 2 to 8 or 10 wt % based on ethylene feed rate; the amount of water ranges from 1 to 50 wt ppm based on the feed rate of primary monomer, preferably ethylene; and the amount of control agent ranges from 0.1 to 40 wt ppm based on the feed rate of primary monomer. In another embodiment, the reactor operates in "condensed mode" such as described in U.S. Pat. No. 5,462,999, with alkane entering the reactor at from 0.5 or 2 wt % to 18 or 50 wt % based on the total weight of the fluidizing medium. In such a condensed mode of operation, the amount of control agent or water may vary to counter the influence of the alkane on the $I_{21}$.

In another aspect of the invention, an amount of an aluminum alkyl is introduced into the reactor. More particularly, the amount of aluminum alkyl once introduced may vary during the polymerization process. It has been found that the introduction, increase or decrease of aluminum alkyl influences the rheological properties of the polymer composition of the invention. Whatever, the case, the $I_{21}$ of a given polymer composition being generated by a bimetallic catalyst composition under polymerization conditions may be controlled by a series of steps in sequence in any order or simultaneously, wherein (a) an amount of alkane is added to the reactor;
(b) an amount of control agent, water, or both is also added to the reactor; and
(d) an amount of aluminum alkyl is added to the reactor;

wherein an addition or increase in alkane precipitates a need to introduce, increase or decrease control agent, water or both; and in another embodiment, a decrease in alkane precipitates a need to introduce, increase or decrease in control agent, water or both. In a particular embodiment, the introduction or increase in the level of alkane precipitates the need to introduce or increase the level of control agent or water.

In a particular embodiment, the target $I_{21}$ ranges from 4 to 20 dg/min; the amount of alkane ranges from 0.5 or 1 or 2 to 8 or 10 wt % based on primary monomer feed rate, preferably ethylene; the amount of control agent ranges from 1 to 50 wt ppm based on the feed rate of primary monomer; the amount of water ranges from 0.1 to 40 wt ppm based on the feed rate of primary monomer; and the amount of aluminum alkyl ranges from 50 to 200 wt ppm based on the feed rate of the primary monomer.

Particular embodiments represent examples of the influences of the various agents introduced into the polymerization reactor. For example, when an alkane is introduced to the reactor or its level increases from between 0.5 to 10 wt % based on the primary monomer feed rate, the $I_{21}$ decreases by from 2 to 50% when the level of introduction of aluminum alkyl, control agent and water to the polymerization reactor remains constant. In another embodiment, when alkane is introduced or its level increased from between 1 to 6 wt % based on ethylene feed rate, the $I_{21}$ decreases by from 2 to 50% when the level of introduction of aluminum alkyl, control agent and water to the polymerization reactor is constant.

The alkanes and aluminum alkyls may be introduced into the reactor by any method known in the art. In a particular embodiment, the alkanes and/or aluminum alkyls are added to the reactor via the recycle line downstream of the heat exchanger and compressor.

3.0 The Bimetallic Catalyst Composition

The bimetallic catalyst composition comprises at least two, preferably two, catalyst compounds having the same or different metal centers, both of which are capable of catalyzing the polymerization of olefins to form polyolefins, the polyolefins in one embodiment having a weight average molecular weight of at least 4,000 amu. In one embodiment, the at least two catalyst components selected from the group consisting of metallocenes, Ziegler-Natta catalysts, metal-amido catalysts, and chromium catalysts ("Phillips-type catalysts"). In a particular embodiment, the bimetallic catalyst composition comprises two catalyst compounds, a first and second catalyst component, both of which are supported on a support medium. The first catalyst component is capable of producing the LMW polymer, and the second catalyst component is capable of producing the HMW polymer as described herein.

In a more particular embodiment, the first catalyst component is a metallocene, and the second catalyst component is a titanium/magnesium based Ziegler-Natta catalyst component. In yet a more particular embodiment, the first and second catalyst components are supported on a support medium with an activator suitable to activate the first catalyst component. In one embodiment, the supported activator is an alumoxane, and in another embodiment, a non-coordinating activator, and in yet another embodiment, a mixture of the two activators. In one embodiment, the activator suitable for activating the Ziegler-Natta catalyst is added to the polymerization reactor such that the bimetallic catalyst composition can make contact with that activator. This is described in, for example, RE 33,683, wherein an aluminum alkyl such as trimethylaluminum is added to the polymerization reactor to effectuate the activation of a titanium-based Ziegler-Natta catalyst component.

3.1 The First Catalyst Component

The first catalyst component that is capable of producing the LMW polymer of the polymer composition is a metallocene in one embodiment. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCENE-BASED POLYOLEFINS 261–377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in a particular embodiment as described further below, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopenta-cyclododecene, phenanthrindenyl, 3,4-benzofluorenyl, 9-phenylfluorenyl, 8-H-cyclopent[a]acenaphthylenyl, 7H-dibenzofluorenyl, indeno[1,2–9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \hspace{2cm} (1)$$

wherein M is as described above; each X is bonded to M; each Cp group is chemically bonded to M; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structure (II) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (II) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) and (U) is independently selected from the group consisting of: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, chloride, fluoride, methyl, phenyl, phenoxy, benzoxy, tosyl, fluoromethyls and fluorophenyls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

In another aspect of the invention, the metallocene catalyst component includes those of formula (I) where $Cp^A$ and $Cp^B$ are bridged to each other by at least one bridging group, (A), such that the structure is represented by formula (U):

$$Cp^A(A)Cp^B MX_n \qquad (II)$$

These bridged compounds represented by formula (II) are known as "bridged metallocenes". $Cp^A$, $Cp^B$, M, X and n in structure (II) are as defined above for formula (I); and wherein each Cp ligand is bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) is cyclic, comprising, for example 4 to 10, 5 to 7 ring members in a more particular embodiment, which may be substituted. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The ligands $Cp^A$ and $Cp^B$ of formulae (I) and (II) are different from each other in one embodiment, and the same in another embodiment.

Non-limiting examples of suitable metallocenes or first catalyst component include:
Bis(methylcyclopentadienyl)zirconium difluoride,
Bis(ethylcyclopentadienyl)zirconium difluoride,
Bis(propylcyclopentadienyl)zirconium difluoride,
Bis(isopropylcyclopentadienyl)zirconium difluoride,
Bis(butylcyclopentadienyl)zirconium difluoride,
Bis(isobutylcyclopentadienyl)zirconium difluoride,
Bis(neopentylcyclopentadienyl)zirconium difluoride,
Bis(cyclopentylcyclopentadienyl)zirconium difluoride,
Bis(cyclohexylmethylcyclopentadienyl)zirconium difluoride,
Bis(allylcyclopentadienyl)zirconium difluoride,
Bis((3-butenyl)cyclopentadienyl)zirconium difluoride,
Bis(trimethylsilylcyclopentadienyl)zirconium difluoride,
Bis(trimethylgermylcyclopentadienyl)zirconium difluoride,
Bis(trimethylsilylmethylcyclopentadienyl)zirconium difluoride,
Bis(1,2-dimethylcyclopentadienyl)zirconium difluoride,
Bis(1,3-dimethylcyclopentadienyl)zirconium difluoride, Bis(1,2,3-trimethylcyclopentadienyl)zirconium difluoride,
Bis(1,2,4-trimethylcyclopentadienyl)zirconium difluoride,
Bis(tetramethylcyclopentadienyl)zirconium difluoride,
Bis(1,3-methylethylcyclopentadienyl)zirconium difluoride,
Bis(1,3-methylpropylcyclopentadienyl)zirconium difluoride,
Bis(1,3-methylbutylcyclopentadienyl)zirconium difluoride,
Bis(phenylcyclopentadienyl)zirconium difluoride,
Bis(1,3-methylphenylcyclopentadienyl)zirconium difluoride,
Bis(benzylcyclopentadienyl)zirconium difluoride,
Bis(1,3-methylbenzylcyclopentadienyl)zirconium difluoride,
Bis(phenethylcyclopentadienyl)zirconium difluoride,
Bis((3-phenylpropyl)cyclopentadienyl)zirconium difluoride,
(Tetramethylcylopentadienyl)(propylcyclopentadienyl)zirconium difluoride,
(Pentamethylcylopentadienyl)(propylcyclopentadienyl)zirconium difluoride,
Cyclopentadienyl(propylcyclopentadienyl)zirconium difluoride,
Cyclopentadienyl(butylcyclopentadienyl)zirconium difluoride,
Cyclopentadienyl(cyclopentylcyclopentadienyl)zirconium difluoride,
Cyclopentadienyl (tetrahydroindenyl)zirconium difluoride,
Cyclopentadienyl(1,3-methylbutylcyclopentadienyl)zirconium difluoride,
Cyclopentadienyl(tetramethylcyclopentadienyl)zirconium difluoride,
Cyclopentadienyl(propyltetramethylcyclopentadienyl)zirconium difluoride,
Cyclopentadienyl(butyltetramethylcyclopentadienyl)zirconium difluoride,
Cyclopentadienyl(cyclopentyltetramethylcyclopentadienyl)zirconium difluoride,
Cyclopentadienyl(indenyl)zirconium difluoride,
Cyclopentadienyl(1-methylindenyl)zirconium difluoride,
Cyclopentadienyl(fluorenyl)zirconium difluoride,
Cyclopentadienyl(tetrahydrofluorenyl)zirconium difluoride,
Cyclopentadienyl(octahydrofluorenyl)zirconium difluoride,
Bis(tetrahydroindenyl)zirconium difluoride,
Bis(trihydropentalenyl)zirconium difluoride,
Bis(pentahydroazulenyl)zirconium difluoride,
Dimethylsilylbis(tetrahydroindenyl)zirconium difluoride,
Ethylenebis(tetrahydroindenyl)zirconium difluoride,
Bis(indenyl)zirconium difluoride,
Bis(1-methylindenyl)zirconium difluoride,
Bis(2-methylindenyl)zirconium difluoride,
Bis(4,7-dimethylindenyl)zirconium difluoride,
Bis(5,6-dimethylindenyl)zirconium di fluoride,
Bis(1-phenylindenyl)zirconium difluoride,
Bis(2-phenylindenyl)zirconium difluoride,
Bis(fluorenyl)zirconium difluoride,
Bis(1-methylfluorenyl)zirconium difluoride,
Bis(2,7-di-t-butylfluorenyl)zirconium difluoride,
Dimethylsilylbis(3-methylcyclopentadienyl)zirconium difluoride,
Dimethylsilylbis(3-propylcyclopentadienyl)zirconium difluoride,
Dimethylsilylbis(2,4-dimethylcyclopentadienyl)zirconium difluoride,
Dimethylsilylbis(2,3,5-trimethylcyclopentadienyl)zirconium difluoride,
Dimethylsilylbis(tetramethylcyclopentadienyl)zirconium difluoride,
Dimethylsilylbis(indenyl)zirconium difluoride,
Dimethylsilylbis(2-methylindenyl)zirconium difluoride,
Dimethylsilylbis(2-methyl-4-phenylindenyl)zirconium difluoride,
Dimethylsilylbis(2-methyl-4-(3,5-di-t-butyl)phenylindenyl)zirconium difluoride,
Dimethylsilylbis(2-methyl-4-naphthylindenyl)zirconium difluoride,
Dimethylsilyl(cyclopentadienyl)(indenyl)zirconium difluoride,
Dimethylsilyl(tetramethylcyclopentadienyl)(indenyl)zirconium difluoride,
Silacyclobutyl(tetramethylcyclopentadienyl)(indenyl)zirconium difluoride,
Silacyclopentyl(tetramethylcyclopentadienyl)(indenyl)zirconium difluoride,
Ethylenebis(indenyl)zirconium difluoride,
Ethylenebis(2-methylindenyl)zirconium difluoride,
Isopropylidene(cyclopentadienyl)(fluorenyl)zirconium difluoride,
Diphenylmethylidene(cyclopentadienyl)(fluorenyl)zirconium difluoride,
Dimethylsilyl(cyclopentadienyl)(fluorenyl)zirconium difluoride,
Diphenylsilyl(cyclopentadienyl)(fluorenyl)zirconium difluoride,
Dimethylsilylbis(fluorenyl)zirconium difluoride,
Ethylenebis(fluorenyl)zirconium difluoride,
Bis(methylcyclopentadienyl)hafnium difluoride,
Bis(ethylcyclopentadienyl)hafnium difluoride,
Bis(propylcyclopentadienyl)hafnium difluoride,
Bis(butylcyclopentadienyl)hafnium difluoride,
Bis(isobutylcyclopentadienyl)hafnium difluoride,
Bis(neopentylcyclopentadienyl)hafnium difluoride,
Bis(cyclopentylcyclopentadienyl)hafnium difluoride,
Bis(allylcyclopentadienyl)hafnium difluoride,
Bis((3-butenyl)cyclopentadienyl)hafnium difluoride,
Bis(cyclohexylmethylcyclopentadienyl)hafnium difluoride,
Bis(trimethylsilylmethylcyclopentadienyl)hafnium difluoride,
Bis((3-phenylpropyl)cyclopentadienyl)hafnium difluoride,
Bis(1,3-methylbutylcyclopentadienyl)hafnium difluoride,
Bis(1,3-methylpropylcyclopentadienyl)hafnium difluoride,
Ethylenebis(indenyl)hafnium difluoride,
Dimethylsilylbis(3-propylcyclopentadienyl)hafnium difluoride,
Dimethylsilylbis(2,4-methylpropylcyclopentadienyl)hafnium difluoride,
Dimethylsilylbis(tetramethylcyclopentadienyl)hafnium difluoride,
Dimethylsilylbis(indenyl)hafnium difluoride,
Diphenylsilylbis(indenyl)hafnium difluoride,
Bis(cyclopentadienyl)titanium difluoride,
Bis(methylcyclopentadienyl)titanium difluoride,
Bis(ethylcyclopentadienyl)titanium difluoride,
Bis(propylcyclopentadienyl)titanium difluoride,
Bis(butylcyclopentadienyl)titanium difluoride,
Bis(isobutylcyclopentadienyl)titanium difluoride,
Bis(neopentylcyclopentadienyl)titanium difluoride,
Bis(cyclopentylcyclopentadienyl)titanium difluoride,
Ethylenebis(indenyl)titanium difluoride,
Dimethylsilylbis(indenyl)titanium difluoride,
Diphenylsilyl(cyclopentadienyl)(fluorenyl)titanium difluoride,
(cyclopentadienyl)zirconium trifluoride,
(indenyl)zirconium trifluoride,
(1-methylindenyl)zirconium trifluoride, (2-methylindenyl)zirconium trifluoride,
(1-propylindenyl)zirconium trifluoride,
(2-propylindenyl)zirconium trifluoride,
(1-butylindenyl)zirconium trifluoride,
(2-butylindenyl)zirconium trifluoride,
(methylcyclopentadienyl)zirconium trifluoride,
(tetrahydroindenyl)zirconium trifluoride,
(pentamethylcyclopentadienyl)zirconium trifluoride,
(cyclopentadienyl)zirconium trifluoride,
pentamethylcyclopentadienyltitanium trifluoride,
tetramethylcyclopentyldienyltitanium trifluoride,
1,2,4-trimethylcyclopentadienylzirconium trifluoride, and mixtures thereof.

In one embodiment, the rac isomer of each is used in the bimetallic catalyst composition, in another embodiment, the meso isomer is used in the bimetallic catalyst composition, and in yet another embodiment, a mixture of rac and meso isomers is used.

3.2 The Second Catalyst Component

The second catalyst component capable of producing a HMW polymer of the polymer composition is a Ziegler-Natta catalyst compound in one embodiment. Ziegler-Natta catalyst compounds are disclosed generally in ZIEGLER CATALYSTS 363–386 (G. Fink, R. Mulhaupt and H. H. Brintzinger, eds., Springer-Verlag 1995); and more particularly in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, and more particularly oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

The Ziegler-Natta catalyst is combined with a support material in one embodiment, either with or without the second catalyst component. The first catalyst component can be combined with, placed on or otherwise affixed to a support in a variety of ways. In one of those ways, a slurry of the support in a suitable non-polar hydrocarbon diluent is contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$–$C_{12}$ alkyl groups, or $C_4$–$C_{10}$ alkyl groups, or $C_4$–$C_8$ alkyl groups. In at least one specific embodiment, the organomagnesium compound is dibutyl magnesium. In one embodiment, the amount of organomagnesium compound included in the silica slurry is only that which will be deposited, physically or chemically, onto the support, for example, being bound to the hydoxyl groups on the support, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) generally range from 0.2 mmol/g to 2 mmol/g in a particular embodiment.

In one embodiment the Ziegler-Natta catalyst, optionally including the organomagnesium compound, is contacted with an electron donor, such as tetraethylorthosilicate (TEOS), an ether such as tetrahydrofuran, or an organic alcohol having the formula R"OH, where R" is a $C_1$–$C_{12}$ alkyl group, or a $C_1$ to $C_8$ alkyl group, or a $C_2$ to $C_4$ alkyl group, and/or an ether or cyclic ether such as tetrahydrofuran. In a particular embodiment, R"OH is n-butanol. The amount of organic alcohol is used in an amount effective to provide an R"OH:Mg mol/mol ratio of from 0.1 to 10, or from 0.2 to 1.5, or from 0.4 to 1.2, or from 0.6 to 1.1, or from 0.9 to 1.0.

The organomagnesium and alcohol-treated slurry is contacted with a non-metallocene transition metal compound. Suitable non-metallocene transition metal compounds are compounds of Group 4 and 5 metals that are soluble in the non-polar hydrocarbon used to form the silica slurry in a particular embodiment. Non-limiting examples of suitable Group 4, 5 or 6 transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, in a particular embodiment from 1 to 6 carbon atoms. Mixtures of such transition metal compounds may also be used. The amount of non-metallocene transition metal compound used is sufficient to give a transition metal to magnesium mot/mol ratio of from 0.1 to 5, or from 0.3 to 1.5, or from 0.5 to 0.8. The diluent can then be removed in a conventional manner, such as by evaporation or filtering, to obtain the dry, supported first catalyst component.

The first and second catalyst components may be contacted with the support in any order. In a particular embodiment of the invention, the first catalyst component is reacted first with the support as described above, followed by contacting this supported first catalyst component with a second catalyst component.

When combined to form the bimetallic catalyst component, the molar ratio of metal from the second catalyst component to the first catalyst component (e.g., molar ratio of Ti:Zr) is a value of from 0.1 to 100 in one embodiment; and from 1 to 50 in another embodiment, and from 2 to 20 in yet another embodiment, and from 3 to 12 in yet another embodiment; and from 4 to 10 in yet another embodiment, and from 4 to 8 in yet another embodiment; wherein a desirable molar ratio of second catalyst component metal: first catalyst component metal is any combination of any upper limit with any lower limit described herein.

3.3 The Support

A support may also be present as part of the bimetallic catalyst system of the invention. Supports, methods of supporting, modifying, and activating supports for single-site catalyst such as metallocenes is discussed in, for example, 1 METALLOCENE-BASED POLYOLEFINS 173–218 (J. Scheirs & W. Kaminsky eds., John Wiley & Sons, Ltd. 2000). The terms "support" or "carrier", as used herein, are used interchangeably and refer to any support material, a porous support material in one embodiment, including inorganic or organic support materials. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, theory, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

The support may be contacted with the other components of the catalyst system in any number of ways. In one embodiment, the support is contacted with the activator to form an association between the activator and support, or a "bound activator". In another embodiment, the catalyst component may be contacted with the support to form a "bound catalyst component". In yet another embodiment, the support may be contacted with the activator and catalyst component together, or with each partially in any order. The components may be contacted by any suitable means as in a solution, slurry, or solid form, or some combination thereof, and may be heated when contacted to from 25° C. to 250° C.

Desirable carriers are inorganic oxides that include Group 2, 3, 4, 5, 13 and 14 oxides and chlorides. Support materials include silica, alumina, silica-alumina, magnesium chloride, graphite, and mixtures thereof in one embodiment. Other useful supports include magnesia, titania, zirconia, montmorillonite (EP 0 511 665 B1), phyllosilicate, and the like. Also, combinations of these support materials may be used, for example, silica-chromium, silica-alumina, silica-titania and the like. Additional support materials may include those porous acrylic polymers described in EP 0 767 184 B1.

In one aspect of the support useful in the invention, the support possess a surface area in the range of from 10 to 700 $m^2/g$, pore volume in the range of from 0.1 to 4.0 $cm^3/g$ and average particle size in the range of from 5 to 500 $\mu m$. In another embodiment, the surface area of the carrier is in the range of from 50 to 500 $m^2/g$, pore volume of from 0.5 to 3.5 $cm^3/g$ and average particle size of from 10 to 200 $\mu m$. In yet another embodiment, the surface area of the carrier is in the range is from 100 to 400 $m^2/g$, pore volume from 0.8 to 3.0 $cm^3/g$ and average particle size is from 5 to 100 $\mu m$. The average pore size of the carrier of the invention typically has pore size in the range of from 10 to 1000 Å, from 50 to 500 Å in another embodiment, and from 75 to 350 Å in yet another embodiment. In yet a more particular embodiment, the support is an inorganic oxide having an average particle size of less than 50 $\mu m$ or less than 35 $\mu m$ and a pore volume of from 0.8 to 1 to 2 or 5 $cm^3/g$.

Dehydration or calcining of the support may or may also be carried out. In one embodiment, the support is calcined prior to reaction with the fluorine or other support-modifying compound. In another embodiment, the support is calcined and used without further modification, or calcined, followed by contacting with one or more activators and/or catalyst components. Suitable calcining temperatures range from 100° C. to 1500° C. in one embodiment, and from 200° C. to 1200° C. in another embodiment, and from 300° C. to 1000° C. in another embodiment, and from 350° C. to 900° C. in yet another embodiment, and from 400° C. to 850° C. in yet a more particular embodiment, and from 800° C. to 900° C. in yet a more particular embodiment, and from 810° C. to 890° C. in yet a more particular embodiment, wherein a desirable range comprises any combination of any upper temperature limit with any lower temperature limit. Calcining may take place in the absence of oxygen and moisture by using, for example, an atmosphere of dry nitrogen. Alternatively, calcining may take place in the presence of moisture and air.

The support, especially an inorganic support or graphite support, may be pretreated such as by a halogenation process or other suitable process that, for example, associates a chemical species with the support either through chemical bonding, ionic interactions, or other physical or chemical interaction. In one embodiment, the support is fluorided. The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$.

A desirable method of treating the support with the fluorine compound is to dry mix the two components by simply blending at a concentration of from 0.01 to 10.0 millimole F/g of support in one embodiment, and in the range of from 0.05 to 6.0 millimole F/g of support in another embodiment, and in the range of from 0.1 to 3.0 millimole F/g of support in yet another embodiment. The fluorine compound can be dry mixed with the support either before or after charging to the vessel for dehydration or calcining the support. Accordingly, the fluorine concentration present on the support is in the range of from 0.2 to 5 wt % in one embodiment, and from 0.6 to 3.5 wt % of support in another embodiment.

Another method of treating the support with the fluorine compound is to dissolve the fluorine in a solvent, such as water, and then contact the support with the fluorine containing solution (at the concentration ranges described herein). When water is used and silica is the support, it is desirable to use a quantity of water that is less than the total pore volume of the support. Desirably, the support and, for example, fluorine compounds are contacted by any suitable means such as by dry mixing or slurry mixing at a temperature of from 100° C. to 1000° C. in one embodiment, and from 200° C. to 800° C. in another embodiment, and from 300° C. to 600° C. in yet another embodiment, the contacting in any case taking place for between two to eight hours.

It is within the scope of the present invention to co-contact (or "co-immobilize") more than one catalyst component with a support. Non-limiting examples of co-immobilization of catalyst components include two or more of the same or different metallocene catalyst components, one or more metallocene with a Ziegler-Natta type catalyst, one or more metallocene with a chromium or "Phillips" type catalyst, one or more metallocenes with a Group 15 containing catalyst (metal amido catalyst), and any of these combinations with one or more activators. More particularly, co-supported combinations include metallocene A/metallocene A; metallocene A/metallocene B; metallocene/Ziegler Natta; metallocene/Group 15 containing catalyst; metallocene/chromium catalyst; metallocene/Ziegler Natta/Group 15 containing catalyst; metallocene/chromium catalyst/Group 15 containing catalyst, any of the these with an activator, and combinations thereof.

Further, the catalyst system of the present invention can include any combination of activators and catalyst components, either supported or not supported, in any number of ways. For example, the catalyst component may include any one or both of metallocenes and/or Group 15 containing catalysts components, and may include any combination of activators, any of which may be supported by any number of supports as described herein. Non-limiting examples of catalyst system combinations useful in the present invention include MN+NCA; MN:S+NCA; NCA:S+MN; MN:NCA:S; MN+A1A; MN:S+A1A; A1A:S+MN; MN:A1A:S; A1A:S+NCA+MN; NCA:S+ MN+A1A; G15+NCA; G15:S+NCA; NCA:S+G15; G15:NCA:S; G15+A1A; G15:S+A1A; A1A:S+G15; G15:A1A:S; A1A:S+NCA+G15; NCA:S+G15+A1A; MN+NCA+G15; MN:S+NCA+G15; NCA:S+MN+G15; MN:NCA:S+G15; MN+G15+A1A; MN:S+A1A+G15; A1A:S+MN+G15; MN:A1A:S+G15; A1A:S+NCA+MN+ G15; NCA:S+MN+A1A+G15; MN+NCA; G15:MN:S+ NCA; G15:NCA:S+MN; G15:MN:NCA:S; G15:MN:S+ A1A; G15:A1A:S+MN; G15:MN:A1A:S; G15:A1A:S+ NCA+MN; G15:NCA:S+MN+A1A; wherein "MN" is metallocene component, "NCA" is a non-coordinating activator including ionic and neutral boron and aluminum based compounds as described above, "A1A" is an aluminum alkyl and/or alumoxane based activator, "G15" is a Group 15 containing catalyst component (or metal amido catalyst) as described above, and "S" is a support; and wherein the use of ":" with "S" means that that those groups next to the colon are associated with ("supported by") the support as by pretreatment and other techniques known in the art, and the "+" sign means that the additional component is not directly bound to the support but present with the support and species bound to the support, such as present in a slurry, solution, gas phase, or another way, but is not meant to be limited to species that have no physico-chemical interaction with the support and/or supported species. Thus, for example, the embodiment "MN:NCA:S+G15" means that a metallocene and NCA activator are bound to a support, and present in, for example, a gas phase polymerization with a Group 15 containing catalyst component.

3.4 The Activator

As used herein, the term "activator" is defined to be any compound or combination of compounds, supported or unsupported, which can activate a single-site catalyst compound (e.g., metallocenes, metal amido catalysts, etc.), such as by creating a cationic species from the catalyst component. Typically, this involves the abstraction of at least one leaving group (X group in the formulas/structures above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO" or "MMAO"), and alkylaluminum compounds as activators, and/or ionizing activators (neutral or ionic) such as tri (n-butyl)ammonium tetrakis(pentafluorophenyl)boron and/or a trisperfluorophenyl boron metalloid precursors to activate desirable metallocenes described herein. MAO and other aluminum-based activators are well known in the art. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347–1374 (2000).

The aluminum alkyl ("alkylaluminum") activator may be described by the formula $AlR^§_3$, wherein $R^§$ is selected from the group consisting of $C_1$ to $C_{20}$ alkyls, $C_1$ to $C_{20}$ alkoxys, halogen (chlorine, fluorine, bromine) $C_6$ to $C_{20}$ aryls, $C_7$ to $C_{25}$ alkylaryls, and $C_7$ to $C_{25}$ arylalkyls. Non-limiting examples of aluminum alkyl compounds which may be utilized as activators for the catalyst precursor compounds for use in the methods of the present invention include trimethylaluminum, triethylaluminum, triisobutylaluminum, tri-n-hexylaluminum, tri-n-octylaluminum and the like.

The alkylaluminum compound, or mixture of compounds, such as trimethylaluminum or triethylaluminum is feed into the reactor in one embodiment at a rate of from 10 wt. ppm to 500 wt. ppm (weight parts per million alkylaluminum feed rate compared to ethylene feed rate), and from 50 wt. ppm to 400 wt. ppm in a more particular embodiment, and from 60 wt. ppm to 300 wt. ppm in yet a more particular embodiment, and from 80 wt. ppm to 250 wt. ppm in yet a more particular embodiment, and from 75 wt. ppm to 150 wt. ppm in yet another embodiment, wherein a desirable range may comprise any combination of any upper limit with any lower limit. The alkylaluminum can be represented by the general formula $AlR_3$, wherein each R is the same or different and independently selected from $C_1$ to $C_{10}$ alkyls and alkoxys.

Examples of neutral ionizing activators include Group 13 tri-substituted compounds, in particular, tri-substituted boron, tellurium, aluminum, gallium and indium compounds, and mixtures thereof. The three substituent groups are each independently selected from alkyls, alkenyls, halogen, substituted alkyls, aryls, arylhalides, alkoxy and halides. In one embodiment, the three groups are independently selected from halogen, mono or multicyclic (including halosubstituted) aryls, alkyls, and alkenyl compounds and mixtures thereof. In another embodiment, the three groups are selected from alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from alkyls having 1 to 4 carbon groups, phenyl, naphthyl and mixtures thereof. In yet another embodiment, the three groups are selected from highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

In another embodiment, the neutral tri-substituted Group 13 compounds are boron compounds such as a trisperfluorophenyl boron, trisperfluoronaphthyl boron, tris(3,5-di (trifluoromethyl)phenyl)boron, tris(di-t-butylmethylsilyl) perfluorophenylboron, and other highly fluorinated trisarylboron compounds and combinations thereof, and their aluminum equivalents. Other suitable neutral ionizing activators are described in U.S. Pat. No. 6,399,532 B1, U.S. Pat. No. 6,268,445 B1, and in 19 ORGANOMETALLICS 3332–3337 (2000), and in 17 ORGANOMETALLICS 3996–4003 (1998).

Illustrative, not limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl) boron, trimethylammonium tetra(p-tolyl)boron, trimethylammonium tetra(o-tolyl)boron, tributylammonium tetra (pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; triaryl carbonium salts (trityl salts) such as triphenylcarbonium tetra(phenyl)boron and triphenylcarbonium tetra(pentafluorophenyl)boron; and triaryl phosphonium salts such as triphenylphosphonium tetra(phenyl)boron, triphenylphosphonium tetra (pentafluorophenyl)boron, tri(methylphenyl)phosphonium tetra(phenyl)boron, tri(dimethylphenyl)phosphonium tetra (phenyl)boron and the like, and their aluminum equivalents.

In yet another embodiment of the activator of the invention, an alkylaluminum can be used in conjunction with a heterocyclic compound. The heterocyclic compound includes at least one nitrogen, oxygen, and/or sulfur atom, and includes at least one nitrogen atom in a particular embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, heteroatoms or the like. Non-limiting examples of hydrocarbon substituents for the heterocyclic compound include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl. There may be from 1 to 6 substituents on the heterocyclic compound in one embodiment, and from 1 to 3 in a particular embodiment.

In yet another embodiment one or more positions on the heterocyclic compound are substituted with a halogen atom or a halogen atom containing group, for example a halogenated aryl group. In one embodiment the halogen is selected from chlorine, bromine and fluorine, and selected from fluorine and bromine in another embodiment, and the halogen is fluorine in yet another embodiment. There may be from 1 to 6 halogen substituents in one embodiment, and from 1 to 3 in another embodiment.

Non-limiting examples of heterocyclic compounds that may be utilized with the activator of the invention include substituted and unsubstituted pyrroles, imidazoles, pyrazoles, pyrrolines, pyrrolidines, purines, carbazoles, indoles, phenyl indoles, 2,5-dimethylpyrroles, 3-pentafluorophenylpyrrole, 4,5,6,7-tetrafluoroindole or 3,4-difluoropyrroles.

In one embodiment, the heterocyclic compound described above is combined with an alkylaluminum or an alumoxane to yield an activator compound which, upon reaction with a catalyst component, for example a metallocene, produces an active polymerization catalyst. Non-limiting examples of suitable alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

In general, the activator and catalyst component(s) are combined in mole ratios of activator to catalyst component from 1000:1 to 0.1:1, and from 300:1 to 1:1 in another embodiment, and from 150:1 to 1:1 in yet another embodiment, and from 50:1 to 1:1 in yet another embodiment, and from 10:1 to 0.5:1 in yet another embodiment, and from 3:1 to 0.3:1 in yet another embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet another embodiment.

4.0 Method of Polymerization

The polymerization process of the present invention may be carried out using any suitable process, for example, solution, slurry and gas phase. A particularly useful method for producing polyolefin polymers according to the present invention is a gas phase polymerization process preferably utilizing a single fluidized bed reactor in a single stage process. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

In one embodiment, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a recycle line and then through a heat exchanger wherein the heat of polymerization is removed, compressed in a compressor and then returned to the reaction zone. The control agents of the present invention may be added to any part of the reactor system as described herein, and in a particular embodiment are introduced into the recycle line, and in even a more particular embodiment, introduced into the recycle line upstream of the heat exchanger.

The reactor temperature of the fluidized bed process herein ranges from 30° C. or 40° C. or 50° C. to 90° C. or 100° C. or 110° C. or 120° C. or 150° C., wherein a desirable temperature range comprises any upper temperature limit combined with any lower temperature limit described herein. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

The gas phase reactor pressure, wherein gases may comprise hydrogen, ethylene and higher comonomers, and other gases, is between 1 (101 kPa) and 100 atm (10,132 kPa) in one embodiment, and between 5 (506 kPa) and 50 atm (5066 kPa) in another embodiment, and between 10 (1013 kPa) and 40 atm (4050 kPa) in yet another embodiment.

The gas phase reactor employing the catalyst system described herein is capable of producing from 500 lbs of polymer per hour (227 Kg/r) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

In another embodiment of the invention, the polymerization is effected by a slurry polymerization process. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed. In this embodiment of the polymerization process, the control agent may be introduced into the liquid medium, either directly into the reactor or in a recycle line.

Another desirable polymerization technique of the invention is referred to as a particle form polymerization, or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 2 METALLOCENE-BASED POLYOLEFINS 322–332 (2000).

The process of the present invention is suitable for the production of homopolymers of olefins, particularly ethylene, and/or copolymers, terpolymers, and the like, of olefins, particularly ethylene, and at least one or more other olefin(s). Preferably the olefins are α-olefins. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 3 or 4 to 10 carbon atoms in yet another embodiment; and ethylene and a comonomer comprising from 4 to 8 carbon atoms in yet another embodiment. Particularly preferred for preparation herein by the process of the present invention are polyethylenes. Such polyethylenes are homopolymers of ethylene and interpolymers of ethylene and at least one α-olefin wherein the ethylene content is at least about 50% by weight of the total monomers involved in one embodiment. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed another way, the mole percent of primary monomer, ethylene in one embodiment, in the reactor ranges from 5 to 95 mole % in one embodiment, and from 10 to 85 mole % in another embodiment, and from 20 to 80 mole % in yet another embodiment, and from 40 to 75 mole % in yet another embodiment.

In conjunction with the control agent, hydrogen gas is used in processes of the present invention to control the final properties of the polymer composition, such as described in POLYPROPYLENE HANDBOOK 76–78 (Hanser Publishers, 1996). The amount of hydrogen used in the polymerization process of the present invention is an amount necessary to achieve the desired FI or MI of the final polyolefin resin. In one embodiment, the mole ratio of hydrogen to total primary monomer (H$_2$:primary monomer) is in a range of from 0.0001 or 0.001 or 0.002 or 0.003 to 0.012 or 0.014 or 0.018 or 0.024, wherein a desirable range may comprise any combination of any upper mole ratio limit with any lower mole ratio limit described herein, and wherein in a particular embodiment the "primary monomer" is ethylene. Expressed another way, the amount of hydrogen in the reactor at any time may range from 1000 ppm to 20,000 ppm in one embodiment, and from 2000 to 10,000 in another embodiment, and from 3000 to 8,000 in yet another embodiment, and from 4000 to 7000 in yet another embodiment, wherein a desirable range may comprise any upper hydrogen limit with any lower hydrogen limit described herein.

A particular embodiment of the polymerization process of the invention is carried out in a single stage process using a single polymerization reactor. However, it is contemplated that the present invention would be useful in a stages process employing two or more reactors in series, wherein one reactor may produce, for example, a high molecular weight polymer and another reactor may produce a low molecular weight polymer. Such commercial polymerization systems are described in, for example, 2 METALLOCENE-BASED POLYOLEFINS 366378 (John Scheirs & W. Kaminsky, eds. John Wiley & Sons, Ltd. 2000); U.S. Pat. No. 5,665,818, U.S. Pat. No. 5,677,375; U.S. Pat. No. 6,472,484; EP 0 517 868 and EP-A-0 794 200.

The bimetallic catalyst composition may be introduced into the polymerization reactor by any suitable means regardless of the type of polymerization reactor used. In one embodiment, the bimetallic catalyst composition is feed to the reactor in a substantially dry state, meaning that the isolated solid form of the catalyst has not been diluted or combined with a diluent prior to entering the reactor. In another embodiment, the catalyst composition is combined with a diluent and feed to the reactor; the diluent in one embodiment is an alkane such as a C$_4$ to C$_{20}$ alkane, toluene, xylene, mineral or silicon oil, or combinations thereof, such as described in, for example, U.S. Pat. No. 5,290,745.

The bimetallic catalyst composition may be combined with up to 2.5 wt % of a metal-fatty acid compound in one embodiment, such as, for example, an aluminum stearate, based upon the weight of the catalyst system (or its components), such as disclosed in U.S. Pat. Nos. 6,300,436 and 5,283,278. Other suitable metals useful in combination with the fatty acid include other Group 2 and Group 5–13 metals. In an alternate embodiment, a solution of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

In another embodiment, the supported catalyst(s) are combined with the activators and are combined, such as by tumbling and other suitable means, with up to 2.5 wt % (by weight of the catalyst composition) of an antistatic agent, such as an ethoxylated or methoxylated amine, an example of which is Kemarine AS-990 (ICI Specialties, Bloomington Del.).

5.0 Polymer Composition and Articles Therefrom

The polymer compositions produced by the methods described herein, are bimodal in one embodiment. The term "bimodal," when used to describe a polyolefin, for example, polypropylene or polyethylene, or other homopolymers, copolymers or terpolymers, means "bimodal molecular weight distribution," which term is understood as having the broadest definition persons in the pertinent art have given that term as reflected in printed publications and issued patents. For example, a single polymer composition that includes polyolefins with at least one identifiable high molecular weight distribution and polyolefins with at least one identifiable low molecular weight distribution is considered to be a "bimodal" polyolefin, as that term is used herein. Those high and low molecular weight polymers may be identified by deconvolution techniques known in the art to discern the two polymers from a broad or shouldered GPC curve of the bimodal polyolefins of the invention, and in another embodiment, the GPC curve of the bimodal polymers of the invention may display distinct peaks with a trough. Desirably, the bimodal polymers of the invention are characterized by a combination of features.

The polymer compositions, ethylene based bimodal polymers in one embodiment, have a density in the range of from 0.89 g/cm$^3$ to 0.970 g/cm$^3$ in one embodiment, and from 0.930 g/cm$^3$ to 0.965 g/cm$^3$ in another embodiment, in the range of from 0.935 g/cm$^3$ to 0.960 g/cm$^3$ in another embodiment, and in the range of from 0.940 g/cm$^3$ to 0.955 g/cm$^3$ in yet another embodiment, and in the range of from 0.945 g/cm$^3$ to 0.950 g/cm$^3$ in yet another embodiment, wherein a desirable density range of the polymer compositions of the invention comprise any combination of any upper density limit with any lower density limit described herein.

The polymer compositions, and in particular, the bimodal polyethylenes of the present invention can be characterized by their molecular weight characteristics such as measured by GPC, described herein. The polymer compositions of the invention have an number average molecular weight (Mn) value of from 2,000 to 70,000 in one embodiment, and from 10,000 to 50,000 in another embodiment, and an weight average molecular weight (Mw) of from 50,000 to 2,000,000 in one embodiment, and from 70,000 to 1,000,000 in another embodiment, and from 80,000 to 800,000 in yet another embodiment. The bimodal polyolefins of the present invention also have an Mz value ranging from greater than 200,000 in one embodiment, and from greater than 800,000 in another embodiment, and from greater than 900,000 in one embodiment, and from greater than 1,000,000 in one embodiment, and greater than 1,100,000 in another embodiment, and from greater than 1,200,000 in yet another embodiment, and from less than 1,500,000 in yet another embodiment; wherein a desirable range of Mn, Mw or Mz comprises any combination of any upper limit with any lower limit as described herein.

The polymer compositions of the invention have a molecular weight distribution, a weight average molecular weight to number average molecular weight (M$_w$/M$_n$), or "Polydispersity index", of from 2.5 to 150 in one embodiment, and from 10 to 90 in another embodiment, and from 15 to 80 in yet another embodiment, and from 20 to 70 in yet another embodiment, and from 25 to 60 in yet another embodiment, wherein a desirable embodiment comprises any combination of any upper limit with any lower limit described herein. The polymer compositions also have a "z-average" molecular weight distribution (Mz/Mw) of from 2 to 20 in one embodiment, from 3 to 20 in another embodiment, and from 4 to 10 in another embodiment, and from 5 to 8 in yet another embodiment, and from 3 to 10 in yet another embodiment, wherein a desirable range may comprise any combination of any upper limit with any lower limit.

The bimodal polymers made by the described processes possess a melt index (MI, or I$_2$ as measured by ASTM-D-

1238-E 190° C./2.16 kg) in the range from 0.01 dg/min to 1000 dg/min in one embodiment, and from 0.01 dg/min to 50 dg/min in another embodiment, and from 0.02 dg/min to 10 dg/min in another embodiment, and from 0.03 dg/min to 2 dg/min in yet another embodiment, wherein a desirable range may comprise any upper limit with any lower limit described herein. The bimodal polyolefins of the invention possess a flow index ($I_{21}$ measured by ASTM-D-1238-F, 190° C./21.6 kg) of from 1 to 1000 dg/min in one embodiment, and from 2 to 100 dg/min in another embodiment, and from 4 to 50 dg/min in yet another embodiment, and from 5 to 20 dg/min in yet another embodiment; wherein a desirable range may comprise any upper limit with any lower limit described herein.

The polymer compositions in certain embodiments have a melt index ratio ($I_{21}/I_2$) of from 20 to 500, and from 40 to 200 in another embodiment, and from 60 to 150 in yet another embodiment, wherein a desirable range may comprise any combination of any upper limit with any lower limit described herein.

Further, the polymer compositions of the invention possess a dynamic viscosity θ at 200° C. and 0.1/sec of from 100 kPoise to 3000 kPoise in one embodiment, 300 kPoise to 1400 kPoise in another embodiment, from 350 kPoise to 1000 kPoise in another embodiment, and from 400 kPoise to 800 kPoise in another embodiment, and from 500 kPoise to 700 kPoise in yet another embodiment. Dynamic viscosity in the examples herein was measured according to as measured by ASTM D4440-95 using a nitrogen atmosphere, 1.5 mm die gap and 25 mm parallel plates at 200° C. and 0.1/sec.

The individual polymers of the polymer composition may also be described by certain embodiments, and in one embodiment, the polymer composition comprises one or more HMW polymers and one or more LMW polymers; and in another embodiment, the polymer composition consists essentially of one HMW polymer and one LMW polymer.

In one embodiment, the molecular weight distribution (Mw/Mn) of the HMW polymer ranges from 3 to 24, and ranges from 4 to 24 in another embodiment, and from 6 to 18 in another embodiment, and from 7 to 16 in another embodiment, and from 8 to 14 in yet another embodiment, wherein a desirable range comprises any combination of any upper limit with any lower limit described herein. The HMW polymer has a weight average molecular weight ranging from 20,000 to 1,000,000 in one embodiment, and from 50,000 to 900,000 in another embodiment, and from 100,000 to 800,000 amu in another embodiment, and from 250,000 to 700,000 amu in another embodiment, wherein a desirable range comprises any combination of any upper limit with any lower limit described herein. The weight fraction of the HMW polymer in the polymer composition ranges may be at any desirable level depending on the properties that are desired in the polymer composition; in one embodiment the HMW polymer weight fraction ranges from greater than 0.01 or 0.1 or 0.2 or 0.3 or 0.4 or 0.45 or 0.55 or 0.6 or 0.7 or 0.8 or 0.9 or 0.95, and less than from 0.99 or 0.9 or 0.8 or 0.7 or 0.65 or 0.6 or 0.55 or 0.5 or 0.45 or 0.4 or 0.3 or 0.2 or 0.1 or 0.05, wherein a desirable range of HMW polymer in the polymer composition comprises any combination of any upper limit with any lower limit described herein. In a particular embodiment, the weight fraction of HMW polymer ranges from 0.3 to 0.7; and from 0.4 to 0.6 in another particular embodiment, and ranges from 0.5 and 0.6 in yet another particular embodiment.

In one embodiment, the molecular weight distribution (Mw/Mn) of the LMW polymer ranges from 1.8 to 6, and from 2 to 5 in another embodiment, and from 2.5 to 4 in yet another embodiment, wherein a desirable range comprises any combination of any upper limit with any lower limit described herein. The LMW polymer has a weight average molecular weight ranging from 2,000 to 200,000 amu in one embodiment, and from 5,000 to 100,000 in another embodiment, and from 5,000 to 50,000 amu in yet another embodiment wherein a desirable range of LMW polymer in the polymer composition comprises any combination of any upper limit with any lower limit described herein. The LMW polymer has an $I_2$ value of from 0.1 to 10,000 dg/min in one embodiment, and from 1 to 5,000 dg/min in another embodiment, and from 100 to 3,000 dg/min in yet another embodiment; and an $I_{21}$ of from 0.001 to 100 dg/min in one embodiment, from 0.01 to 50 dg/min in another embodiment, and from 0.1 to 10 dg/min in yet another embodiment; wherein for the $I_2$ and $I_{21}$ values, a desirable range comprises any combination of any upper limit with any lower limit described herein. The $I_{21}$ of the LMW polymer may be determined by any technique known in the art; and in one embodiment is determined by deconvolution of the GPC curve and from relationships between molecular weights and $I_2$ values.

The polyolefins of the present invention may be blended with additives to form compositions that can then be used in articles of manufacture. Those additives include processing aids, antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide. These and other common additives in the polyolefin industry may be present in polyolefin compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In particular, antioxidants and stabilizers such as organic phosphites, hindered amines, and phenolic antioxidants may be present in the polyolefin compositions of the invention from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)symtriazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); 1,3,5-Tri(3,5-di-tert-butyl-4-hydroxybenzyl-isocyanurate (IRGANOX 3114); tris(nonylphenyl)phosphite (TNPP); and Octadecyl-3,5-Di-tert)-butyl-4-hydroxyhydrocinnamate (IRGANOX 1076).

Fillers may be present from 0.1 to 50 wt % in one embodiment, and from 0.1 to 25 wt % of the composition in another embodiment, and from 0.2 to 10 wt % in yet another embodiment. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, acetylene black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may also be present in the polyolefin compositions of the present invention. Such salts may be present from 0.001 to 2 wt % of the composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate. Other organic salts that are useful as additives include glyceryl monostearate, etc.

With respect to the physical process of producing the blend of polyolefin and one or more additives, sufficient mixing should take place to assure that a uniform blend will be produced prior to conversion into a finished product. The polyolefin suitable for use in the present invention can be in any physical form when used to blend with the one or more additives. In one embodiment, reactor granules, defined as the granules of polymer that are isolated from the polymerization reactor, are used to blend with the additives. The reactor granules have an average diameter of from 10 $\mu$m to 5 mm, and from 50 $\mu$m to 10 mm in another embodiment. Alternately, the polyolefin is in the form of pellets, such as, for example, having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

The resultant polyolefin and polyolefin compositions of the present invention may be further processed by any suitable means such as by calendering, casting, coating, compounding, extrusion, foaming; all forms of molding including compression molding, injection molding, blow molding, rotational molding, and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, PLASTICS PROCESSING (Radian Corporation, Noyes Data Corp. 1986).

The polymer compositions of the present invention may also be blended with other polymers. In a particular embodiment, the polymer compositions described herein are blended with high pressure polymerized low density polyethylene, or with linear low density polyethylene in another embodiment, or with other polymers or elastomers, non-limiting examples of which include polypropylene, ethylene-propylene rubber, butyl rubber, high density polyethylene, polycarbonate, polyamides, and polystyrenes.

In the case of injection molding of various articles, simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

Common rheological properties, processing methods and end use applications of metallocene based polyolefins are discussed in, for example, 2 METALLOCENE-BASED POLYOLEFINS 400–554 (John Scheirs & W. Kaminsky, ads. John Wiley & Sons, Ltd. 2000). The polyolefinic compositions of the present invention are suitable for such articles as films, fibers and nonwoven fabrics, extruded articles and molded. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Other desirable articles that can be made from and/or incorporate the polyolefins of the present invention include automotive components, sporting equipment, outdoor furniture (e.g., garden furniture) and playground equipment, boat and water craft components, and other such articles. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Further useful articles and goods may be formed economically or incorporate the polyolefins produced by the practice of our invention including: crates, containers, packaging material, labware, office floor mats, instrumentation sample holders and sample windows; liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid, particularly water, milk, or juice, containers including unit servings and bulk storage containers.

Thus, the compositions of the present invention can be described alternately by any of the embodiments disclosed herein, or a combination of any of the embodiments described herein. Embodiments of the invention, while not meant to be limiting by, may be better understood by reference to the following examples.

EXAMPLES

The following examples relate to gas phase polymerization procedures carried out in a fluidized bed reactor, utilizing ethylene and either a hexene or butene comonomer, resulting in production of polyethylene. The tables identify each run, along with the reported reaction conditions for each run. Various properties of the resulting product are also identified.

The fluidized bed was made up of polymer granules. During each run, the gaseous feed streams of ethylene and hydrogen were introduced before the reactor bed into a recycle gas line. The injections were downstream of the recycle line heat exchanger and compressor. Liquid hexene or butene comonomer was introduced before the reactor bed. The isopentane or hexane, if any, was added before the reactor bed into a recycle gas line in gaseous or liquid form. The trimethylaluminum was added before the reactor bed into a recycle gas line in gaseous or liquid form. The individual flows of ethylene, hydrogen and hexene comonomer were controlled to maintain target reactor conditions, as identified in each example. The concentrations of gases were measured by an on-line chromatograph, and reported in the tables.

In each run, supported bimetallic catalyst was injected directly into the fluidized bed using purified nitrogen. Catalyst injection rates were adjusted to maintain approximately constant production rate. In each run, the catalyst used was made with silica dehydrated at 875° C., and metallocene compound $Cp_2MX_2$ wherein each Cp is a n-butyl substituted cyclopentadienyl ring, M is Zirconium, and X is fluoride. The titanium source was $TiCl_4$.

An example of the method of making the bimetallic catalyst used in the Examples is as follows: silica support material, Davison Sylopol® 955 Silica is used. The silicas are dehydrated at a temperature of 875° C. Then, for each sample, a non-metallocene catalyst is combined with the dehydrated silica. That is, for each sample, 500 grams of the respective dehydrated silica is added into a 5-liter, 3-neck round bottom flask enclosed in an $N_2$ glove box. Anhydrous hexane (2500 ml) is then added into the flask, making a silica/hexane slurry. The slurry is heated to a temperature of about 54° C. while under constant stirring, and 380 grams of a 15 wt. % solution of dibutyl magnesium is added to the slurry over a period of about 20 minutes. The slurry is then allowed to stand for an additional 30 minutes. Butanol (27.4 grams) is diluted to volume with hexane in a 125 ml volumetric flask. The entire 125 ml of diluted butanol solution is added dropwise into the flask containing the slurry, and then the slurry is held at a temperature of about 54° C. for 30 minutes while under constant agitation. The amount of butanol may be varied, depending upon the desired concentrations. Titanium tetrachloride (41.0 grams) is diluted to volume with hexane in a 125 ml volumetric flask. The entire 125 ml of diluted titanium tetrachloride solution is then added dropwise into the flask containing the slurry. Following the addition of the solution, the slurry is allowed to stand for about 30 minutes at a temperature of about 54° C. The slurry is then allowed to cool to ambient temperature.

The metallocene catalyst compound is then added to the sample of titanium tetrachloride-treated dehydrated silica. First, 673 grams of a 30 wt. % solution of methylaluminoxane (MAO) in toluene is added to a new flask in an $N_2$ glove box. About 13.72 grams of the metallocene bis-n-butyl-cyclopentadienyl zirconium difluoride is added into the MAO solution, and the mixture is stirred until all of the solids are dissolved. Next, the MAO/Metallocene mixture is slowly added into the flask containing the previously prepared titanium reaction slurry over a period of about one hour. Toluene (50 ml) is used to wash the residual MAO/Metallocene mixture remaining in the flask into the flask containing the reaction slurry. The Al/Zr molar ratio (Al from MAO) may range from about 90 to 110; the Ti/Zr molar ratio is about 6. Each resulting mixture that included the respective bimetallic catalyst sample is then held at ambient temperature for a period of one hour. Afterward, each mixture is dried using a rotary vaporizer, followed by removing most of the hexanes using a vacuum pressure of 21 mmHg at a temperature of 52° C. The high boiling point toluene was subsequently removed using a vacuum pressure of 28 mmHg at a temperature of 70° C. The final dried bimetallic catalyst appears brown in color as a free flowing solid. Each sample is used in a separate polymerization run in a gas phase reactor, under the conditions identified in the Tables to form a polyethylene polymer composition. This example procedure is capable of being scaled-up by 250 to 1000 times these amounts listed.

During each run, the reacting bed of growing polymer particles was maintained in a fluidized state by a continuous flow of the make-up feed and recycle gas through the reaction zone. As indicated in the tables, each run utilized a target reactor temperatures ("Bed Temperature"), typically, a reactor temperature of about 203° F. or 95° C. During each run, reactor temperature was maintained at an approximately constant level by adjusting up or down the temperature of the recycle gas to accommodate any changes in the rate of heat generation due to the polymerization.

Example 1

Impact of iC5 Feed at 95° C. Reaction Temperature

Table 1 shows a comparison between polyethylene production with and without feed of isopentane (iC5). These runs took place on the same reactor. Run number 1 was done using iC5, with an iC5 feed rate equal to 4.2 wt % of the ethylene feed rate. Run 2 was done using no iC5 feed, at the same reactor temperature of about 95° C. Without iC5 feed, a much lower water feed rate was required to maintain approximately the same resin FI. Normally, a decrease in water feed rate as seen between run 1 and 2, namely 19.8 to 14.5 wt ppm water feed rate, would cause an FI drop of at least 30%. However, the omission of iC5 feed for run 2 was sufficient to cause FI to be 7% higher in run 2. Isopentane feed significantly influenced the polymer FI, with higher iC5 feed rate giving lower FI.

Example 2

Impact of iC5 Feed at 100° C. Reaction Temperature

Table 1 shows a comparison between polyethylene production with and without feed of isopentane (iC5). These runs took place sequentially on the same reactor. Run number 3 was done using iC5, with an iC5 feed rate equal to 4.3 wt % of the ethylene feed rate. Run 4 was done using no iC5 feed, at the same reactor temperature of about 100° C. Without iC5 feed, a lower water feed rate was used and there was a significant increase in resin FI. Normally, a decrease in water feed rate as seen between run 3 and 4, namely 22.8 to 21.2 wt ppm water feed rate, would cause an FI drop of at least 5%. However, the omission of iC5 feed for run 4 was sufficient to cause FI to be 24% higher in run 4. Isopentane feed significantly influenced the polymer FI, with higher iC5 feed rate giving lower FI.

Example 3

Impact or Hexane Feed at 95° C. Reaction Temperature

Table 2 shows a comparison between polyethylene production with and without feed of hexane. These runs took place sequentially the same reactor. Run number 5 was done using hexane, with a hexane feed rate equal to 1.1 wt % of the ethylene feed rate. Run 6 was done using no hexane feed, at the same reactor temperature of about 95° C. Without hexane feed, a much lower water feed rate was required to maintain approximately the same resin FI. Normally, a decrease in water feed rate as seen between run 5 and 6, namely 26.4 to 16.3 wt ppm water feed rate, would cause an FI drop of at least 40%. However, the omission of hexane feed for run 6 was sufficient to cause FI to be 15% higher in run 6. Hexane feed significantly influenced the polymer FI, with higher hexane feed rate giving lower FI.

Example 4

Impact of TMA Feed at 95° C. Reaction Temperature

Tables 1 and 2 allow a comparison between polyethylene production comparing between 100 and 125 wt ppm trimethylaluminum (TMA) feed rate. These runs took place on the same reactor. Run number 2 was done using 100 ppm TMA feed rate. Run 6 was done using 125 ppm TMA feed rate, with other reaction variables except water feed rate at similar values. With higher TMA feed in run 6, a higher water feed rate still was not sufficient to raise resin FI. Normally, an increase in water feed rate as seen between run 2 and 6, namely 14.5 to 16.3 wt ppm water feed rate, would cause an FI increase of at least 10%. However, with the higher TMA feed rate for run 6, the FI decreased by 33% in run 6. TMA feed rate significantly influenced the polymer FI, with higher TMA feed rate giving lower FI. Run 6 is shown in comparison to Run 2 in FIG. 1, showing the influence of TMA on the split.

Example 5

Impact of TMA Feed with Concurrent Isopropyl Alcohol Feed

Figure 2:
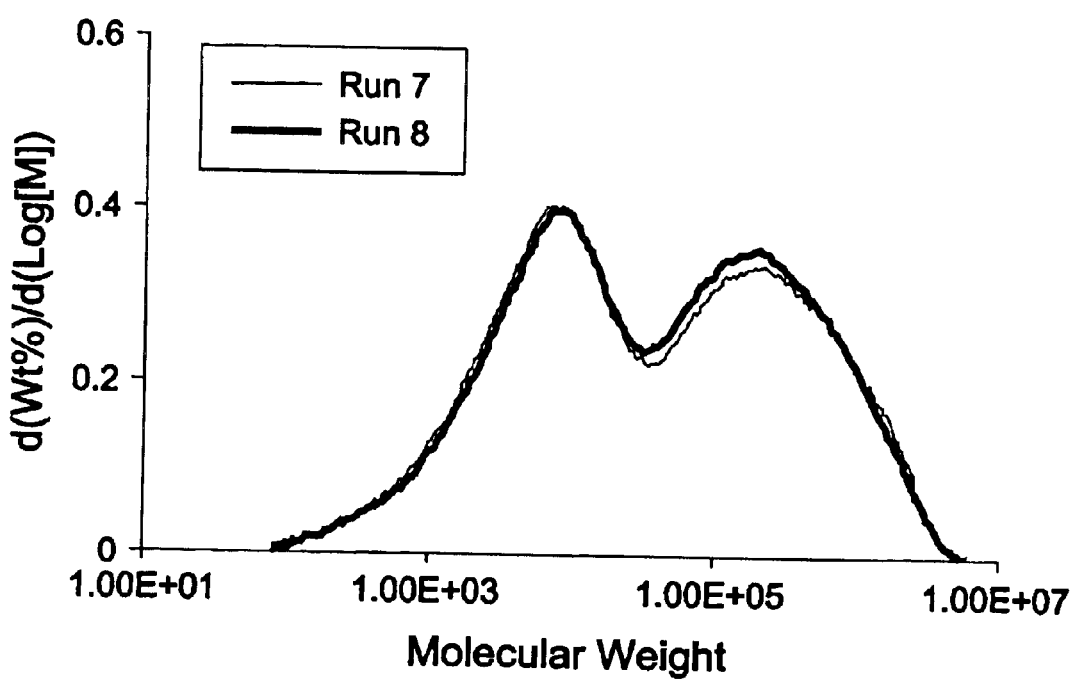
FIG. 2 is a graphic representation of GPC data derived from runs 7 and 8 exemplifying the effects of an aluminum alkyl as described in the Examples.

Table 2 shows a comparison between polyethylene production comparing between 100 and 125 wt ppm trimethylaluminum (TMA) feed rate using a fixed isopropyl alcohol feed rate of approximately 15 ppm. These runs took place sequentially on the same reactor. Run number 7 was done using 100 ppm TMA feed rate. Run 8 was done using 125 ppm TMA feed rate, with other reaction variables except water feed rate at similar values. With higher TMA feed in run 8, a higher water feed rate still was not sufficient to raise resin FI. Normally, an increase in water feed rate as seen between run 7 and 8, namely 9.1 to 12.7 wt ppm water feed rate, would cause an FI increase of at least 20%. However, with the higher TMA feed rate for run 8, the FI decreased by 34% in run 8. TMA feed rate significantly influenced the polymer FI, with higher TMA feed rate giving lower FI. FIG. 2 shows the effect of TMA as comparisons of Runs 7 and 8.

TABLE 1

Process and PE Product data for Examples 1 and 2.

| Run number | 1 | 2 | 3 | 4 |
|---|---|---|---|---|
| Process average end time | Day 1 01:00 | Day 4 11:00 | Day 2 11:00 | Day 3 07:00 |
| Description (control agent) | iC5, 95° C. | 95° C. | iC5, 100° C. | 100° C. |
| iC5 feed rate (wt % based on ethylene feed) | 4.2 | 0 | 4.3 | 0 |
| TMA feed rate (wt ppm based on ethylene feed) | 100 | 100 | 100 | 100 |
| $H_2O/C_2$ (wt ppm based on ethylene feed rate) | 19.8 | 14.5 | 22.8 | 21.1 |
| Residence Time (hrs) | 3.45 | 3.43 | 3.40 | 3.74 |
| Ethylene ($C_2$) Partial Pressure (psia) | 204.5 | 203.5 | 204.3 | 203.2 |
| $H_2/C_2$ measured Ratio (mole/mole) | 0.0110 | 0.0105 | 0.0093 | 0.0090 |
| Hexene/Ethylene ($C_6/C_2$) measured Ratio (mole/mole) | 0.009 | 0.010 | 0.010 | 0.009 |
| $H_2/C_2$ Flow Ratio (milli-lb/lb) | 0.71 | 0.78 | 0.66 | 0.73 |
| $C_6/C_2$ Flow Ratio (lb/lb) | 0.025 | 0.025 | 0.025 | 0.025 |
| $N_2$ Concentration in cycle gas (mole fraction) | 0.260 | 0.331 | 0.263 | 0.326 |
| Reactor Pressure (psig) | 300 | 300 | 300 | 299 |
| Bed Temperature (° C.) | 95.0 | 95.1 | 100.0 | 100.0 |
| Fluidization Gas Velocity (ft/sec) | 1.90 | 1.80 | 1.80 | 1.78 |
| Catalyst Productivity (lb PE/lb catalyst) | 6620 | 7630 | 5500 | 5360 |
| PE polymer composition | | | | |
| FI (dg/min) | 13.0 | 13.9 | 9.5 | 11.8 |
| MFR | 134.8 | 138.6 | 134 | 179.5 |
| Density (g/cm³) | 0.9499 | 0.9502 | 0.9461 | 0.9500 |

TABLE 2

Process and PE Product data for Examples 3, 4, and 5.

| Run number | 5 | 6 | 7 | 8 |
|---|---|---|---|---|
| Process average end time | Day 1 09:00 | Day 9 19:00 | Day 5 07:00 | Day 7 07:00 |
| Description (control agent) | hexane, TMA | TMA | TMA | TMA |
| Hexane feed rate (wt % based on ethylene feed) | 1.1 | 0 | 0 | 0 |
| TMA feed rate (wt ppm based on ethylene feed) | 125 | 124 | 100 | 125 |
| $H_2O/C_2$ (wt ppm based on ethylene feed rate) | 26.4 | 16.3 | 9.1 | 12.7 |
| Isopropyl alcohol feed rate (wt ppm based on ethylene feed) | 0 | 0 | 15.1 | 14.9 |
| Residence Time (hrs) | 3.63 | 3.77 | 3.74 | 3.86 |
| Ethylene ($C_2$) Partial Pressure (psia) | 204.2 | 203.8 | 204.8 | 203.9 |
| $H_2/C_2$ measured Ratio (mole/mole) | 0.0110 | 0.0114 | 0.0108 | 0.0112 |
| Hexene/Ethylene ($C_6/C_2$) measured Ratio (mole/mole) | 0.008 | 0.010 | 0.009 | 0.010 |
| $H_2/C_2$ Flow Ratio (milli-lb/lb) | 0.81 | 0.86 | 0.88 | 0.90 |
| $C_6/C_2$ Flow Ratio (lb/lb) | 0.023 | 0.025 | 0.025 | 0.025 |
| $N_2$ Concentration in cycle gas (mole fraction) | 0.303 | 0.327 | 0.322 | 0.325 |

TABLE 2-continued

Process and PE Product data for Examples 3, 4, and 5.

|  | 5 | 6 | 7 | 8 |
|---|---|---|---|---|
| Hexane Concentration in cycle gas (mole fraction) | 0.039 | 0.011 | — | — |
| Reactor Pressure (psig) | 299 | 299 | 300 | 300 |
| Bed Temperature (° C.) | 95.0 | 95.0 | 95.0 | 95.0 |
| Fluidization Gas Velocity (ft/sec) | 1.85 | 1.85 | 1.80 | 1.90 |
| Catalyst Productivity (lb PE/lb catalyst) | 7300 | 6960 | 6580 | 6580 |
| PE polymer composition |  |  |  |  |
| FI (dg/min) | 8.1 | 9.3 | 13.1 | 8.7 |
| MFR | 94 | 116.3 | 153.8 | 92.2 |
| Density (g/cm$^3$) | 0.9495 | 0.9474 | 0.9510 | 0.9487 |

One advantage of the present invention is that the relative level of the HMW and LMW polymers can be controlled, and in particular, that the rheological properties of the resultant polymer composition can be controlled. Another advantage of the present invention is the reduction of gels (spots of discontinuity wherein a portion of the polymer is immiscible in the surrounding bulk polymer) in the polymer compositions produced herein, and further in the films and other articles produced from the polymer compositions. Another advantage is that the use of the control agents of the present invention also have been shown to reduce reactor fouling in gas phase reactors, thus increasing the utility of such a process as claimed herein. Yet another advantage of the present invention is the ease of transition in the reactor from the bimetallic catalyst composition to, for example, a chromium catalyst which is known to be sensitive to alcohols and ether agents. Such a transition in the reactor from the bimetallic catalyst composition comprising a metallocene/Ziegler-Natta composition to a chromium oxide type catalyst was made without reduction in the expected activity and productivity of the chromium catalyst.

Yet another advantage of the present invention is the maintenance of a useful catalyst activity (productivity) when using from 0.1 to 50 ppm of the control agent. In one embodiment, the total bimetallic catalyst productivity decreases by less than 60%, and by less than 50% in another embodiment, and by less than 40% in a more particular embodiment, and by less than 30% in yet a more particular embodiment, and by less than 20% in yet a more particular embodiment. While some ether/alcohol compounds have been disclosed to deactivate Ziegler-type catalysts, such as in U.S. Pat. No. 5,200,502, and to deactivate metallocene catalysts, such as in EP 0 630 910, it is unexpected that these compounds can be used to selectively adjust the activity/productivity of bimetallic catalyst compositions as shown herein, while advantageously maintaining a useful overall catalyst activity/productivity for the bimetallic catalyst composition.

The polymer composition may be processed by any technique common in the art to produce a variety of products; processing techniques include injection molding, blow molding, roto-molding or formed into a sheet or tubing; wherein the polymer composition used to make these products may first be extruded and pelleted by techniques common in the art and blended with any combination of additives such as processing aids and antioxidants.

One embodiment of the method of producing a polymer composition is as follows. For a given polymerization run, a choice is made by the resin manufacturer to produce a polymer composition which possesses a desirable "target $I_{21}$ value", such as, for example, a range of from 5 to 15 dg/min for a composition to be made into certain desirable end products such as films, and a range of from 22 to 38 dg/min for a polymer composition to used in blow molding applications. The target $I_{21}$ value is typically a range of values in practice, such as a range of +/−2 to +/−10 dg/min about any value of from 3 to 100 or 200 dg/min, depending on the desired target value and the desired level of fluctuation in the actual target value in various batches of the polymer composition coming off the reactor.

Having determined a target $I_{21}$, the method of the invention further entails the incorporation of a high molecular weight polymer into a low molecular weight polymer to form the polymer composition in a single gas phase polymerization reactor in the presence of polymerizable monomers, a bimetallic catalyst composition and at least one control agent. In a particular embodiment, the "incorporation" of the two polymer components is an in situ process taking place in one polymerization reactor, in one stage from the time polymerizable monomers are contacted in the reactor bed with catalyst, to the time that the polymer composition is drawn from the reactor bed for further processes (e.g., blending, pelleting, etc). The control agent can be any agent as disclosed herein, and is chosen to best suit the needs of the given polymerization conditions and end product that is desired. For example, it may be determined before the polymerization run that a certain control agent or blend of control agents influences in the most desirable manner the given catalyst components of the bimetallic catalyst composition being used.

The control agent, either as a liquid, nebulized solid, solution, or other form, is added to the reactor, preferably injected in the recycle line, in an amount sufficient to control the weight average molecular weight of the high molecular weight polymer, the level of low molecular weight polymer, or both. Stated another way, the control agent is chosen and added such that it alters, either by increasing or decreasing, the polymerization activity of one or both of the catalyst components of the bimetallic catalyst composition.

In certain embodiments described herein, the gas phase polymerization reactor comprises a fluidized bed and a fluidizing medium, the fluidizing medium comprising an alkane selected from the group consisting of $C_4$ to $C_{20}$ alkanes. As the alkane is added to the reactor, and/or its concentration in the reactor is increased, there is typically a need to adjust the $I_{21}$ of the polymer composition, as it may vary as alkane concentration changes. Alternately, or in combination with addition or removal of alkanes, aluminum alkyls may be added to or taken away from the reactor, thus influencing the $I_{21}$ of the polymer composition. In either or both cases, the level of control agent will typically be adjusted to maintain the polymer composition at its target $I_{21}$. For example, as the amount of alkane increases in the reactor, the amount of control agent may be increased in order to maintain the polymer composition at its target $I_{21}$. Further, as the level of aluminum alkyl increases, the level of control agent may need to go up. The reverse is typically necessary when the alkane and/or aluminum alkyl level is decreased. In any case, water may also be added to the reactor in a desirable amount. Thus, in such a manner, the target $I_{21}$ can be maintained. The examples above demonstrate the dynamic between the level of control agent, alkanes such as isopentane and hexane, and aluminum alkyls such as trimethylaluminum. The examples show that by proper adjustment of the level of control agent and/or water, the rheological properties of the polymer composition can be controlled when using a bimetallic catalyst composition in a single stage reactor process.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A method of producing a polymer composition having a target $I_{21}$ comprising incorporating a high molecular weight polymer into a low molecular weight polymer to form the polymer composition in a single gas phase polymerization reactor in the presence of polymerizable monomers, a bimetallic catalyst composition and at least one control agent; wherein the control agent is added in an amount sufficient to control the weight average molecular weight of the high molecular weight polymer, the level of low molecular weight polymer, or both;
wherein the gas phase polymerization reactor comprises a fluidized bed and a fluidizing medium, the fluidizing medium comprising an alkane selected from the group consisting of $C_4$ to $C_{20}$ alkanes; and
wherein as the amount of alkane increases in the reactor, the amount of control agent is increased in order to maintain the polymer composition at its target $I_{21}$.

2. A method of controlling the $I_{21}$ of a polymer composition having a target $I_{21}$ comprising forming a high molecular weight polymer and a low molecular weight polymer in a single gas phase polymerization reactor in the presence of polymerizable monomers, a bimetallic catalyst composition and at least one control agent; wherein the control agent is added in an amount sufficient to control the weight average molecular weight of the high molecular weight polymer, the level of low molecular weight polymer, or both;
wherein the gas phase polymerization reactor comprises a fluidized bed and a fluidizing medium, the fluidizing medium comprising an alkane selected from the group consisting of $C_4$ to $C_{20}$ alkanes; and
wherein as the amount of alkane increases in the reactor, the amount of control agent is increased in order to maintain the polymer composition at its target flow index.

3. A method of producing a polymer composition having a target $I_{21}$ comprising contacting a bimetallic catalyst composition, a control agent and polymerizable monomers in a single gas phase polymerization reactor; characterized in that the bimetallic catalyst composition comprises a first catalyst component and a second catalyst component, wherein the first catalyst component is capable of producing a low molecular weight polymer and the second catalyst component is capable of producing a high molecular weight polymer; wherein the control agent substantially alters the polymerization activity of the first or second catalyst component relative to the second or first catalyst component, respectively;
wherein the gas phase polymerization reactor comprises a fluidized bed and a fluidizing medium, the fluidizing medium comprising an alkane selected from the group consisting of $C_4$ to $C_{20}$ alkanes; and
wherein as the amount of alkane increases in the reactor, the amount of control agent is increased in order to maintain the polymer composition at its target flow index.

4. The method of claim 1, 2 or 3, wherein the polymer composition has a target $I_{21}$ of from 3 to 200 dg/min; and wherein
(a) an amount of alkane is added to the reactor; and
(b) an amount of control agent, water or both is added to the reactor;
wherein an increase in the amount of alkane precipitates introduction or increase in the amount of control agent, water or both; and a decrease in the amount of alkane precipitates a removal or decrease of the amount of control agent, water or both.

5. The method of claim 4, wherein $I_{21}$ ranges from 4 to 50 dg/min; the amount of alkane ranges from 0.5 to 10 wt % based on primary monomer feed rate; the amount of water ranges from 1 to 50 wt ppm based on the feed rate of primary monomer; and the amount of control agent ranges from 0.1 to 40 wt ppm based on the feed rate of primary monomer.

6. The method of claim 1, 2 or 3, wherein the reactor operates in condensed mode, with alkane entering the reactor at from 2 to 50 wt % based on the total weight of the fluidizing medium.

7. The method of claim 1, 2 or 3, wherein the control agent is in a nebulous or gaseous state at a temperature of from 50° C. to 120° C. and a pressure of from 1 to 100 bar.

8. The method of claim 1, 2 or 3, wherein the gas phase reactor comprises a recycle line, and wherein the control agent is added to the recycle line downstream of the heat exchanger.

9. The method of claim 1, 2 or 3, wherein control agent is selected from the group consisting of alcohols, ethers, aldehydes, ketones, amines, $O_2$, carbon monoxide, and mixtures thereof.

10. The method of claim 1, 2 or 3, wherein the control agent is selected from the group consisting of $C_1$ to $C_{10}$ mono-alcohols and $C_2$ to $C_{10}$ mono-ethers, oxygen, and combinations thereof.

11. The method of claim 1, 2 or 3, wherein the control agent is present from greater than 1 wt ppm based on the primary monomer feed rate.

12. The method of claim 1, 2 or 3, wherein an aluminum alkyl is also introduced into the reactor.

13. The method of claim 12, wherein the aluminum alkyl is added at a level of from 1 to 500 wt ppm based the feed rate of the primary monomer.

14. The method of claim 12, wherein the $I_{21}$ of the polymer composition decreases upon an increase in the amount of aluminum alkyl to the reactor.

15. The method of claim 1, 2 or 3, wherein the polymer composition has a target $I_{21}$ of from 4 to 100 dg/min; and wherein
   (a) an amount of alkane is added to the reactor;
   (b) an amount of control agent, water, or both is also added to the reactor; and
   (c) an amount of aluminum alkyl is added to the reactor;
   wherein an increase in the amount of alkane precipitates introduction of or an increase in the amount of control agent, water or both; and an increase in the amount of aluminum alkyl precipitates an introduction or an increase in the amount of control agent, water or both such as to maintain the $I_{21}$ value of the polymer composition at its target value.

16. The method of claim 15, wherein $I_{21}$ ranges from 4 to 50 dg/min; the amount of alkane ranges from 0.5 to 10 wt % based on primary monomer feed rate; the amount of water ranges from 1 to 50 wt ppm based on the feed rate of primary monomer; the amount of control agent ranges from 0.1 to 40 wt ppm based on the feed rate of primary monomer; and the amount of aluminum alkyl ranges from 50 to 200 wt ppm based on the feed rate of the primary monomer.

17. The method of claim 1, 2 or 3, wherein when alkane is introduced or its level of introduction is increased from between 0.5 to 10 wt % based on primary monomer feed rate, the $I_{21}$ decreases by from 2 to 50% when the level of introduction of aluminum alkyl, control agent and water to the polymerization reactor remains constant.

18. The method of claim 1, 2 or 3, wherein when alkane is introduced or its level of introduction is increased from between 1 to 6 wt % based on primary monomer feed rate, the $I_{21}$ decreases by from 2 to 50% when the level of introduction of aluminum alkyl, control agent and water to the polymerization reactor remains constant.

19. The method of claim 1, 2 or 3, wherein the bimetallic catalyst composition comprises an inorganic oxide support and at least two catalyst components selected from the group consisting of metallocenes, Ziegler-Natta catalysts, and metal-amido catalysts.

20. The method of claim 1, 2 or 3, wherein the bimetallic catalyst composition comprises an inorganic oxide support, a metallocene, and a titanium and magnesium-containing Ziegler-Natta catalysts.

21. The method of claim 1, 2 or 3, wherein the bimetallic catalyst composition comprises a metallocene comprising at least one fluoride ion leaving group.

22. The method of claim 20, wherein the inorganic oxide support is silica having an average particle size of from 50 μm or less and a pore volume of from 0.8 to 5 cm$^3$/g.

23. The method of claim 20, wherein the inorganic oxide support is silica having an average particle size of from 35 μm or less and a pore volume of from 1 to 2 cm$^3$/g.

24. The method of claim 1, 2 or 3, wherein the polymerizable monomers are ethylene and an olefin selected from $C_3$ to $C_{10}$ α-olefins.

25. The method of claim 1, 2 or 3, wherein the gas phase polymerization reactor is operated at a temperature of from below the melting point of the polymer composition to above 50° C.

26. The method of claim 1, 2 or 3, wherein monomers, an aluminum alkyl, and an alkane ranging from 1 to 10 wt % based on the flow rate of primary monomer are added to the polymerization reactor to obtain the polymer composition having a $I_{21}$ of A; followed by the introduction of a control agent ranging from 0.1 to 100 ppm based on the flow rate of primary monomer and optionally water ranging from 1 to 50 ppm based on the rate of primary monomer introduction to the polymerization reactor, in order to obtain a polymer composition having a flow index value of B; wherein the value of A is lower than the value of B by greater than 2 dg/min in $I_{21}$ value.

27. The method of claim 1, 2 or 3, wherein monomers, hydrogen, an aluminum alkyl, and an alkane ranging from 1 to 10 wt % based on the flow rate of primary monomer are added to the polymerization reactor to obtain the polymer composition having a $I_{21}$ of A; followed by the introduction of a continuous amount of a control agent ranging from 0.1 to 50 ppm based on the flow rate of primary monomer and optionally water ranging from 1 to 50 ppm based on the rate of primary monomer introduction to the polymerization reactor, the introduction of control agent and optionally water being at the recycle line upstream from the heat exchanger of the polymerization reactor, in order to obtain a polymer composition having a flow index value of B; wherein the value of A is lower than the value of B by greater than 2 dg/min in $I_{21}$ value.

28. The method of claim 1, 2 or 3, wherein the polymer composition is a bimodal polymer composition having a molecular weight distribution (Mw/Mn) of from 2.5 to 150, a molecular weight distribution (Mw/Mn) of from 2 to 10, an $I_2$ of from 0.01 to 10 dg/min, an $I_{21}$ of from 4 to 100 dg/min, and a density in the range of from 0.890 to 0.970 g/cm$^3$.

29. The method of claim 1, 2 or 3, wherein the polymer composition is a bimodal polymer composition having a molecular weight distribution (Mw/Mn) of from 15 to 150, a molecular weight distribution (Mz/Mw) of from 3 to 10, an $I_2$ of from 0.01 to 2 dg/min, an $I_{21}$ of from 4 to 100 dg/min, and a density in the range of from 0.930 to 0.960 g/cm$^3$.

30. The method of claim 1, 2 or 3, wherein the polymer composition has a dynamic viscosity η at 200° C. and 0.1/sec of from 100 kPoise to 3000 kPoise as measured by ASTM D 4440-84.

31. The method of claim 1, 2 or 3, wherein the polymer composition has a dynamic viscosity η at 200° C. and 0.1/sec of from 300 kPoise to 1400 kPoise as measured by ASTM D 4440-84.

32. The method of claim 1, 2 or 3, wherein the molecular weight distribution (Mw/Mn) of the high molecular weight polymer ranges from 3 to 24.

33. The method of claim 1, 2 or 3, wherein the polymer composition has an Mz value of from greater than 200,000 amu.

34. The method of claim 1, 2 or 3, wherein the polymer composition has an Mz value of from greater than 800,000 amu.

35. The method of claim 1, 2 or 3, wherein the high molecular weight polymer has a weight average molecular weight ranging from 100,000 to 1,000,000 amu.

36. The method of claim 1, 2 or 3, wherein the high molecular weight polymer has a weight average molecular weight ranging from 250,000 to 800,000 amu.

37. The method of claim 1, 2 or 3, wherein the low molecular weight polymer has a weight average molecular weight ranging from 5,000 to 100,000 amu.

38. The method of claim 1, 2 or 3, wherein the low molecular weight polymer has a weight average molecular weight ranging from 5,000 to 80,000 amu.

39. The method of claim 1, 2 or 3, wherein the polymer composition is formed into a pipe or film.

40. The method of claim 1, 2, or 3, wherein the polymer composition is injection molded, blow molded, roto-molded or formed into a sheet or tubing.

* * * * *